United States Patent
Lee et al.

(10) Patent No.: US 10,684,754 B2
(45) Date of Patent: Jun. 16, 2020

(54) METHOD OF PROVIDING VISUAL SOUND IMAGE AND ELECTRONIC DEVICE IMPLEMENTING THE SAME

(71) Applicant: Samsung Electronics Co., Ltd., Suwon-si, Gyeonggi-do (KR)

(72) Inventors: Younggyun Lee, Gumi-si (KR); Dooyong Park, Gumi-si (KR); Eunjung Seo, Gumi-si (KR); Jaehak Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 14/827,786

(22) Filed: Aug. 17, 2015

(65) Prior Publication Data

US 2016/0054895 A1 Feb. 25, 2016

(30) Foreign Application Priority Data

Aug. 21, 2014 (KR) .......................... 10-2014-0109244

(51) Int. Cl.
*G06F 3/0484* (2013.01)
*G06F 3/0481* (2013.01)
(Continued)

(52) U.S. Cl.
CPC ........ *G06F 3/04842* (2013.01); *G06F 3/0484* (2013.01); *G06F 3/04817* (2013.01);
(Continued)

(58) Field of Classification Search
CPC ............ G06F 3/04842; G06F 3/04817; G06K 9/00671; G10L 17/00
See application file for complete search history.

(56) References Cited

U.S. PATENT DOCUMENTS 7,117,157 B1   10/2006 Taylor et al.
7,493,559 B1 *  2/2009 Wolff .................... G06F 17/241
                                              715/727
(Continued)

FOREIGN PATENT DOCUMENTS

CN   101656814 A   2/2010
CN   101997969 A   3/2011
(Continued)

OTHER PUBLICATIONS

European Office Action dated Jan. 28, 2019, issued in European Patent Application No. 15833933.3.
(Continued)

*Primary Examiner* — Sherrod L Keaton
(74) *Attorney, Agent, or Firm* — Jefferson IP Law, LLP

(57) ABSTRACT

A method of providing a visual sound image, which may generate, edit, and play back a visual sound image in which sound data is linked to an image, and an electronic device implementing the same are provided. The method includes an electronic device including a display, an image including at least one object on the display, receiving, by the electronic device, a selection of at least a certain area of the object in the image displayed on the display or a selection of a certain area of the image, and linking, by the electronic device, sound data to the at least the certain area of the object or the certain area of the image. In addition, various embodiments are possible.

28 Claims, 29 Drawing Sheets

(51) Int. Cl.
*G06K 9/00* (2006.01)
*G10L 17/00* (2013.01)

(52) U.S. Cl.
CPC ..... *G06K 9/00315* (2013.01); *G06K 9/00288* (2013.01); *G06K 9/00671* (2013.01); *G10L 17/00* (2013.01)

(56) References Cited

U.S. PATENT DOCUMENTS

| | | | |
|---|---|---|---|
| 7,912,289 B2* | 3/2011 | Kansal | G06K 9/325 |
| | | | 358/1.18 |
| 8,131,750 B2* | 3/2012 | Bathiche | G06F 17/30525 |
| | | | 348/231.5 |
| 8,548,211 B2 | 10/2013 | Casillas et al. | |
| 2002/0054059 A1* | 5/2002 | Schneiderman | G06F 17/241 |
| | | | 715/700 |
| 2005/0200710 A1 | 9/2005 | Suzuki et al. | |
| 2006/0230353 A1 | 10/2006 | Miller et al. | |
| 2011/0039598 A1 | 2/2011 | Tang et al. | |
| 2011/0243449 A1* | 10/2011 | Hannuksela | G06K 9/00221 |
| | | | 382/190 |
| 2012/0030629 A1 | 2/2012 | Kujda et al. | |
| 2012/0047459 A1 | 2/2012 | Ejima et al. | |
| 2012/0098946 A1 | 4/2012 | Seung | |
| 2012/0151398 A1* | 6/2012 | Foy | G06F 17/30268 |
| | | | 715/769 |
| 2012/0242860 A1* | 9/2012 | Noren | G06F 16/634 |
| | | | 348/231.4 |
| 2013/0310011 A1 | 11/2013 | Kim et al. | |
| 2014/0006921 A1* | 1/2014 | Gopinath | G06F 17/241 |
| | | | 715/230 |
| 2014/0108963 A1 | 4/2014 | Black et al. | |
| 2014/0132782 A1 | 5/2014 | Tomat et al. | |
| 2014/0164927 A1* | 6/2014 | Salaverry | G06F 3/16 |
| | | | 715/727 |
| 2014/0181657 A1 | 6/2014 | Chang | |
| 2014/0201126 A1* | 7/2014 | Zadeh | A61B 5/4803 |
| | | | 706/52 |
| 2014/0314391 A1* | 10/2014 | Kim | G11B 27/11 |
| | | | 386/248 |
| 2015/0222780 A1* | 8/2015 | Lee | H04N 1/2129 |
| | | | 348/231.99 |
| 2015/0271618 A1* | 9/2015 | Kim | H04S 1/002 |
| | | | 381/17 |
| 2015/0363157 A1* | 12/2015 | Chang | G06F 3/04847 |
| | | | 715/722 |

FOREIGN PATENT DOCUMENTS

| | | |
|---|---|---|
| EP | 2 503 545 A1 | 9/2012 |
| GB | 2 351 628 B | 10/2003 |
| KR | 10-1031291 B1 | 4/2011 |
| KR | 10-2012-0001516 A | 1/2012 |
| KR | 10-2012-0068078 A | 6/2012 |
| KR | 10-2013-0128708 A | 11/2013 |

OTHER PUBLICATIONS

Chinese Office Action dated Aug. 30, 2019, issued in Chinese Patent Application No. 201580044928.2.

* cited by examiner

- CONVENTIONAL PNG Structure

- Visual Sound (PNG)

⟨620⟩

⟨625⟩

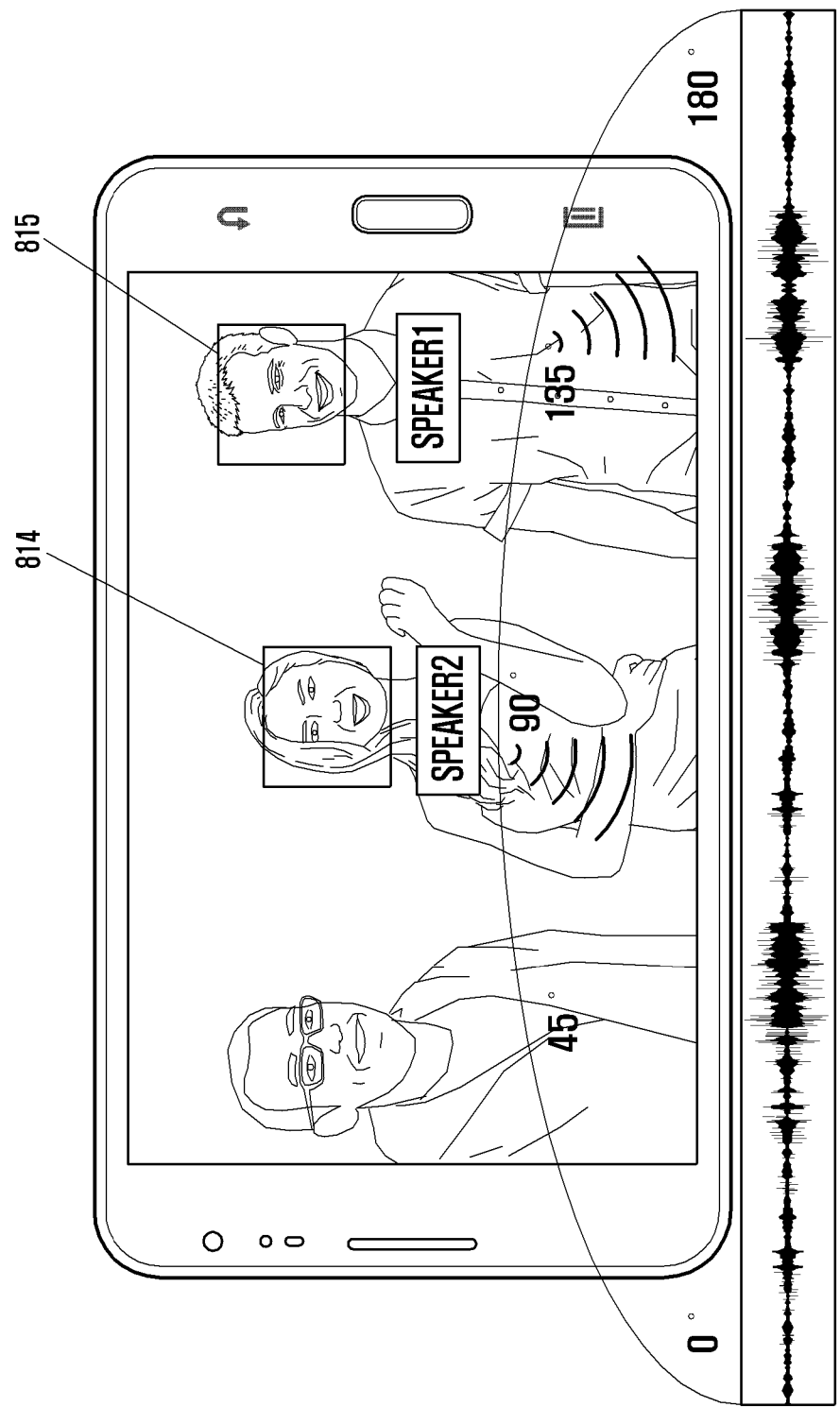

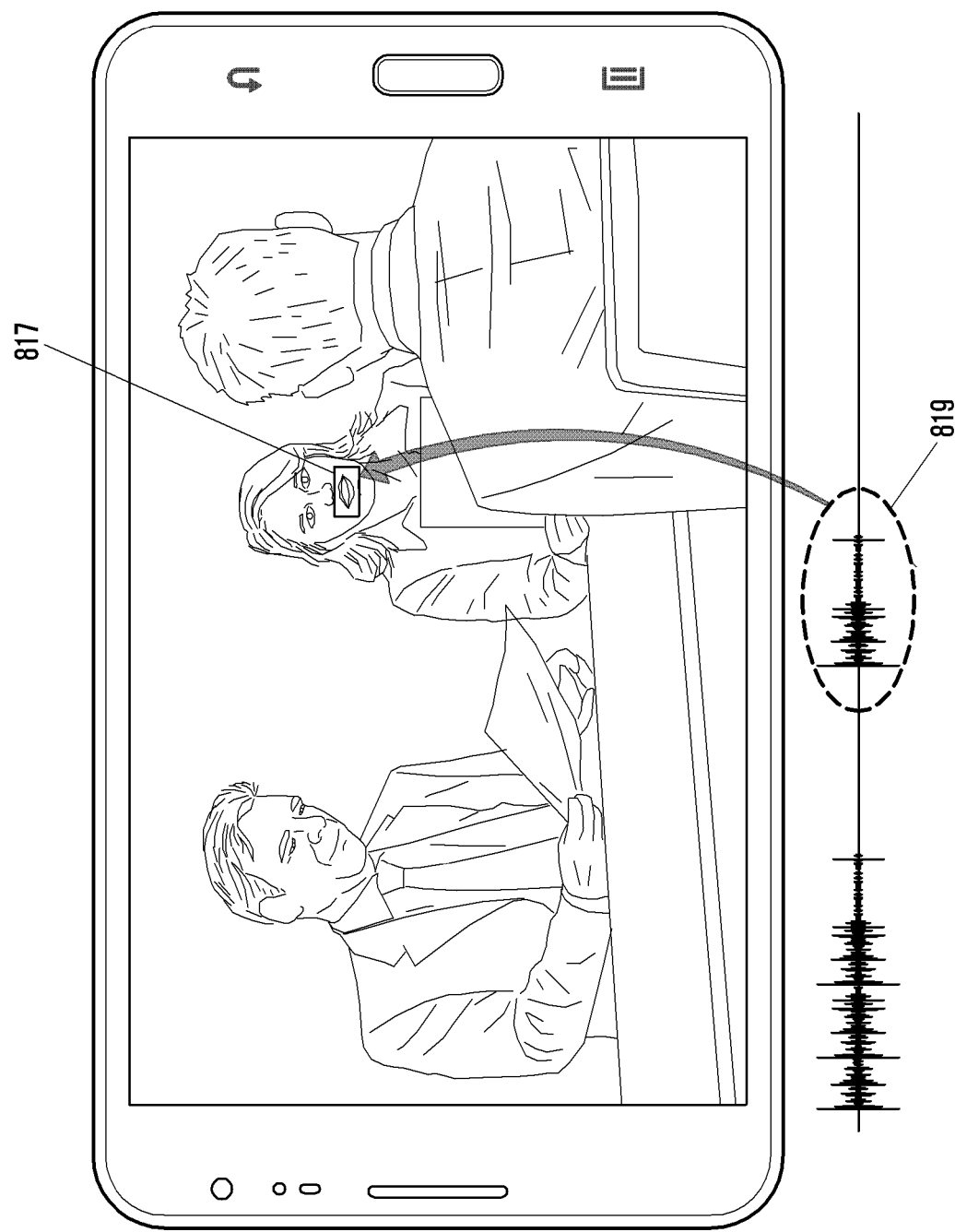

METHOD OF PROVIDING VISUAL SOUND IMAGE AND ELECTRONIC DEVICE IMPLEMENTING THE SAME

CROSS-REFERENCE TO RELATED APPLICATION(S)

This application claims the benefit under 35 U.S.C. § 119(a) of a Korean patent application filed on Aug. 21, 2014 and assigned Serial number 10-2014-0109244, the entire disclosure of which is hereby incorporated by reference.

TECHNICAL FIELD

The present disclosure relates to a method of providing a visual sound image, which may generate, edit, and play back a visual sound image in which sound data is linked to an image, and an electronic device implementing the same.

BACKGROUND

According to the remarkable development of information communication technologies and semiconductor technologies, the propagation and the use of electronic devices (for example, a mobile communication terminal, a smart phone, a tablet personal computer (PC)) has rapidly increased. Accordingly, the electronic device has become a modern necessity because it provides various functions required by users. For example, the electronic device provides various functions such as calling, photographing an image or video, receiving broadcastings, connecting to the Internet, recording or the like.

The electronic device provides a function of linking sound data to a photographed image (hereinafter referred to as a sound shot function) when photographing is executed.

The above information is presented as background information only to assist with an understanding of the present disclosure. No determination has been made, and no assertion is made, as to whether any of the above might be applicable as prior art with regard to the present disclosure.

SUMMARY

The sound shot function may link a single piece of sound data to a single image. As described above, when a single piece of sound data is linked to a single image, there is difficulty in recognizing the correlation between the image and the linked sound data. For example, when sound data obtained by recording a voice of a predetermined person is linked to an image including a plurality of persons, a user may have difficulty in recognizing which of the plurality of persons' voices corresponds to the linked sound data unless playing back the linked sound data.

Also, when a user desires to link a plurality of persons' voices to an image, conventionally, the user should record the plurality of persons' voices sequentially so as to generate a single sound data file or should edit a plurality of pieces of sound data as a single piece of sound data, which is inconvenient.

Aspects of the present disclosure are to address at least the above-mentioned problems and/or disadvantages and to provide at least the advantages described below. Accordingly, an aspect of the present disclosure is to provide an apparatus and method for selecting a certain area of an image, and linking sound data to the selected certain area of the image.

Another aspect of the present disclosure is to provide an apparatus and method for selectively playing back sound data linked to a certain area of an image, or sequentially playing back the entire sound data.

Another aspect of the present disclosure is to provide an apparatus and method for converting at least a part of sound data linked to a certain area of an image into text, and displaying the text.

In accordance with an aspect of the present disclosure, a method of operating an electronic device is provided. The method includes displaying, by the electronic device, an image including at least one object on a display, receiving, by the electronic device, a selection of at least a certain area of the object in the image displayed on the display or a selection of a certain area of the image, and linking, by the electronic device, sound data to the at least the certain area of the object or the certain area of the image.

In accordance with another aspect of the present disclosure, a method of operating an electronic device is provided. The method includes displaying, by the electronic device, an image including at least one object on a display, the image including at least one of a symbol, an icon, text, a photo, and a picture, which indicates a linkage between an object or a certain area of the image and sound data, receiving, by the electronic device, a selection of at least one of the symbol, the icon, the text, the photo, and the picture, included in the image displayed on the display, and outputting, by the electronic device, sound data through a sound output device, in response to at least a part of the input.

In accordance with another aspect of the present disclosure, an electronic device is provided. The electronic device includes a display unit configured to display an image including at least one object, a controller configured to receive a selection of at least a certain area of the object in the displayed image or a certain area of the image, and generate a visual sound image by linking the selected certain area of the object or the certain area of the image to sound data, and a storage unit configured to store the visual sound image.

In accordance with an aspect of the present disclosure, an electronic device is provided. The electronic device includes a display unit configured to display an image including at least one of a symbol, an icon, text, a photo, and a picture indicating that sound data is linked to an object or a certain area of an image, an audio processing unit configured to output linked sound data when at least one of the symbol, the icon the text, the photo, and the picture is selected, and a controller configured to control the display unit and the audio processing unit, so as to display the image, to receive an input of selecting at least one of the symbol, the icon, the text, the photo, and the picture, and to output the linked sound data based on the input.

According to various embodiments of the present disclosure, at least one piece of sound data may be linked to at least a certain area of an image, respectively.

Also, according to various embodiments of the present disclosure, sound data linked to a certain area of an image may be selectively played back, or a plurality of pieces of sound data may be sequentially played back.

Also, according to various embodiments of the present disclosure, at least a part of sound data linked to a certain area of an image may be converted into text, and the text may be displayed in the image. Through the above, a user may recognize rough contents in advance, without playing back the sound data linked to the certain area of the image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features and advantages of the present disclosure will be more apparent from the following detailed description in conjunction with the accompanying drawings, in which:

FIGS. 8A, 8B, 8C, 8D, 8E, 8F, 8G, and 8H are diagrams illustrating screens in association with a method of selecting a certain area of an image according to an embodiment of the present disclosure;

Throughout the drawings, it should be noted that like reference numbers are used to depict the same or similar elements, features, and structures.

DETAILED DESCRIPTION

Figure 1A:
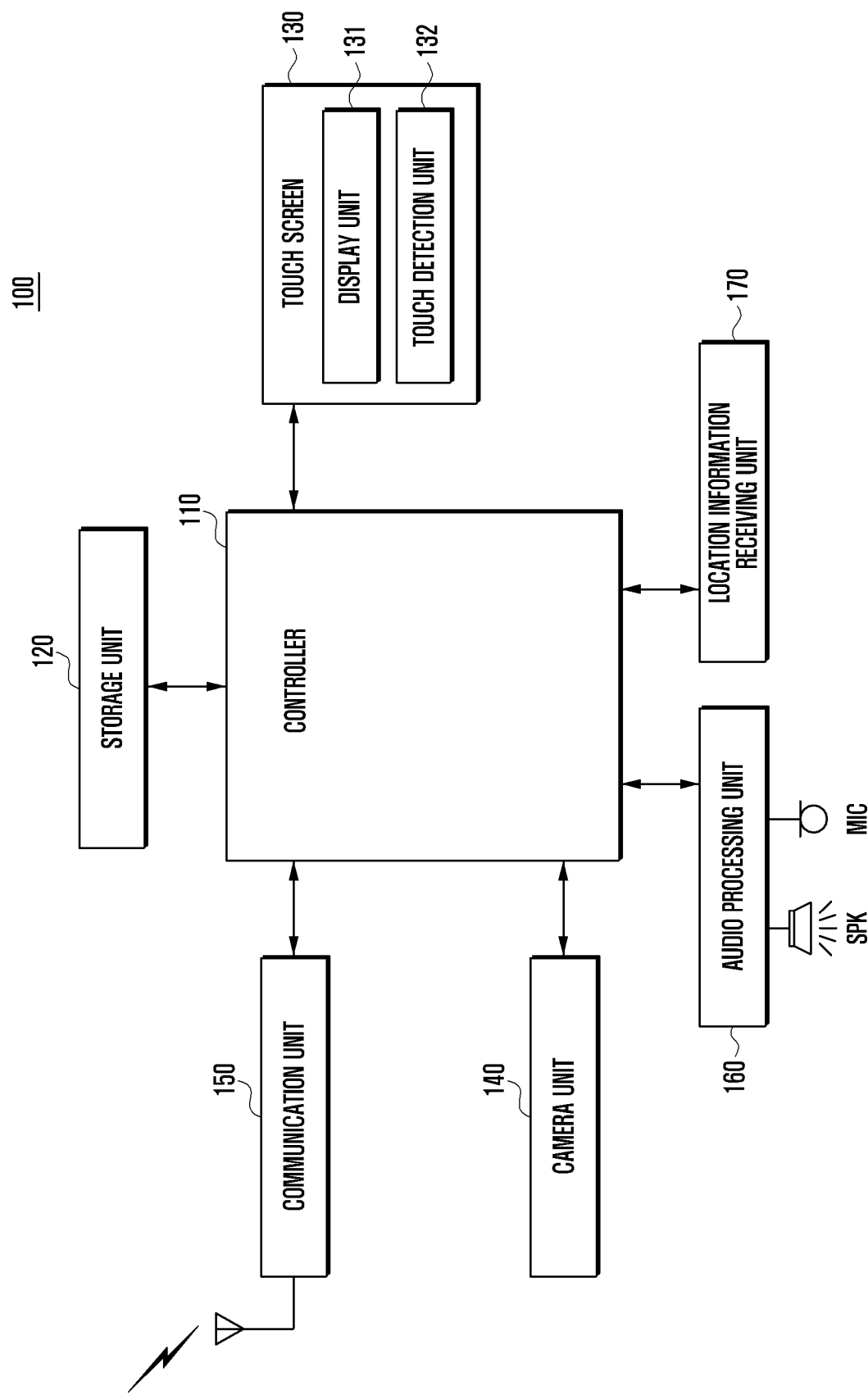
FIG. 1A is a block diagram of a configuration of an electronic device according to an embodiment of the present disclosure.

The following description with reference to the accompanying drawings is provided to assist in a comprehensive understanding of various embodiments of the present disclosure defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements.

Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms as used in embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g. a head-mounted-device (HMD) such as electronic glasses, electronic clothes, an electronic bracelet, an electronic necklace, an electronic appcessory, electronic tattoos, or a smartwatch).

According to some embodiments, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may refer to a person who uses an electronic device or a device (e.g., artificial intelligence electronic device) that uses an electronic device.

Figure 1B:
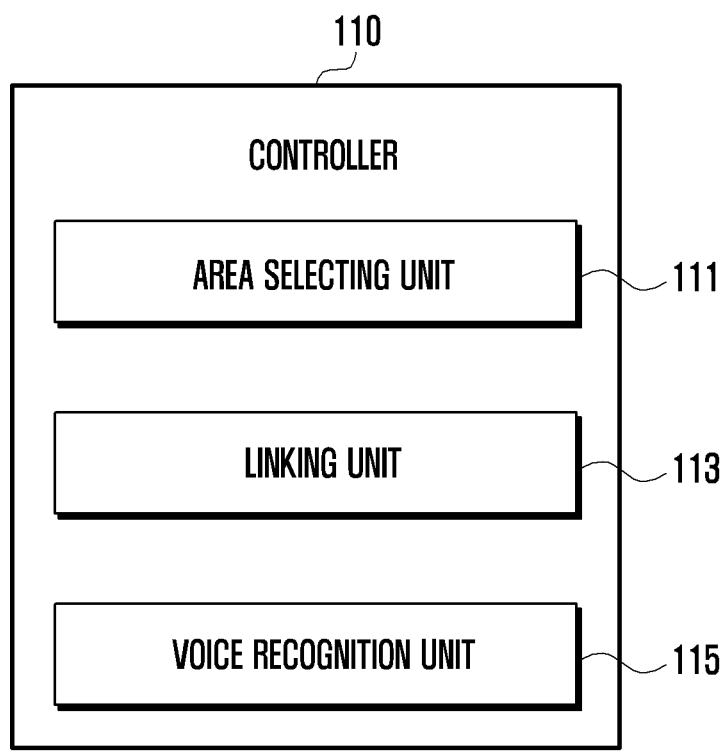
FIG. 1B is a block diagram illustrating a configuration of a controller in an electronic device according to an embodiment of the present disclosure.
Figure 2:
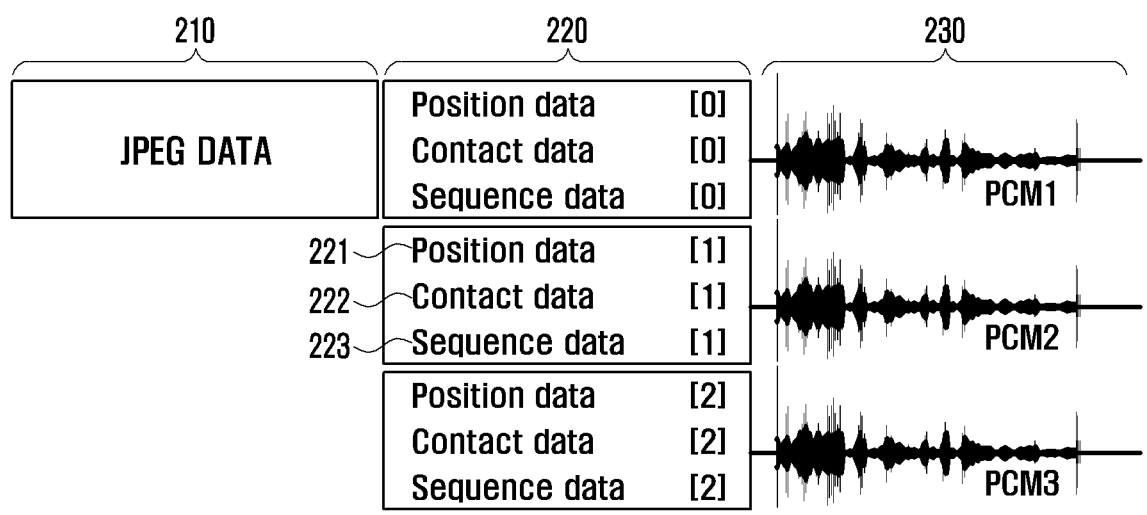
FIGS. 2 and 3 are diagrams illustrating a data structure of a visual sound image according to an embodiment of the present disclosure.
Figure 3:
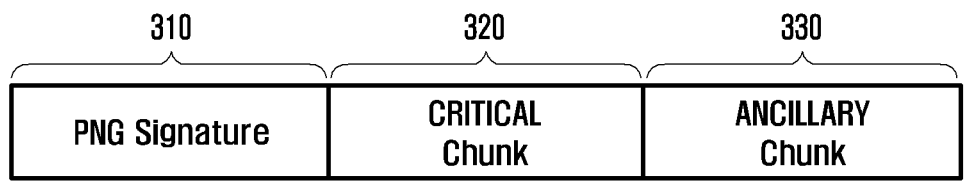
Figure 3:
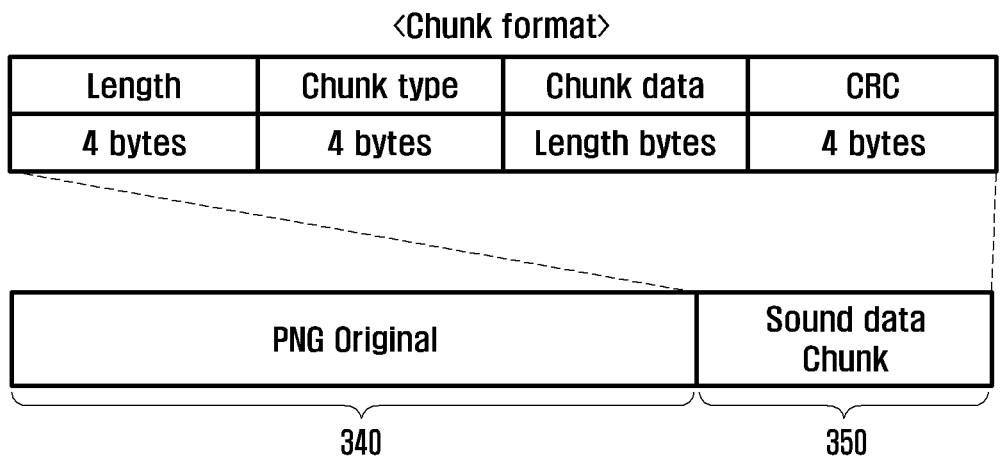

FIG. 1A is a block diagram of a configuration of an electronic device according to an embodiment of the present disclosure. FIG. 1B is a block diagram illustrating a configuration of a controller in an electronic device according to an embodiment of the present disclosure. FIGS. 2 and 3 are diagrams illustrating a data structure of a visual sound image according to an embodiment of the present disclosure.

Referring to FIGS. 1A to 3, an electronic device 100 according to an embodiment of the present disclosure, may include a controller 110, a storage unit 120, a touch screen 130, a camera unit 140, a communication unit 150, an audio processing unit 160, and a location information receiving unit 170. The touch screen 130 may include a display unit 131 and a touch detection unit 132.

The controller 110 may control overall operations of the electronic device 100 and a signal flow between internal blocks of the electronic device 100, and may perform a data processing function for processing data. For example, the controller 110 may be embodied as a central processing unit (CPU), an application processor (AP), or the like. The controller 110 may be embodied as a single core processor or a multi-core processor.

The controller 110 according to an embodiment of the present disclosure may control a procedure that outputs an image including a least one object to the display unit 131, and links at least one piece of sound data to a certain area of the image (for example, at least a part of the object, at least a part of an area where an object does not exist in the image, or at least a part of a back ground area of the image) so as to generate a visual sound image, a procedure that plays back the visual sound image, a procedure that edits the visual sound image, a procedure that shares the visual sound image, and the like. To this end, the controller 110 may include an area selecting unit 111, a linking unit 113, and a voice recognition unit 115, as illustrated in FIG. 1B.

The area selecting unit 111 may select a certain area of an image (for example, an image stored in advance or a preview image). For example, the area selecting unit 111 may select a certain area of an image, through a gesture of a user, detection or recognition of a subject, detection of a direction where a sound occurs, tracking a lip, tracking a line of sight, recognition of a speaker, and the like. The method of selecting a certain area of an image will be described later with reference to FIGS. 8A to 8H.

The linking unit 113 may link sound data to a certain area of an image. The linking unit 113 may link one of sound data stored in advance, newly generated sound data, and address information of a webpage where sound data exists, to a certain area of an image selected by the area selecting unit 111. In this instance, an indicator (for example, a symbol, an icon, text, a photo, a picture, or the like) indicating that the sound data is linked may be displayed. Also, the selected certain area of the image may be displayed to be visually distinguished (for example, highlighting, black and white, blurring, or the like) from the remaining area that is not selected.

The voice recognition unit 115 may convert sound data into text. For example, the voice recognition unit 115 may support a speech to text (STT) function. The voice recognition unit 115 according to an embodiment of the present disclosure may convert at least a part of sound data linked to a certain area of the visual sound image into text when the visual sound image is output. The text obtained through conversion may be displayed around the certain area of the image. For example, the text may be displayed in a word bubble (speech bubble).

The controller 110 may display a visual sound image. The visual sound image may include at least one of an indicator (symbol, icon, text, photo, picture, or the like) indicating that sound data is linked, text converted from at least a part of sound data, and an entire playback icon for requesting playback of the entire sound data linked to the image. The controller 110 may selectively play back sound data linked to the visual sound image, or may sequentially play back the entire sound data, in response to a request from a user. The controller 110 may play back sound data linked to a corresponding area when an area to which sound data is linked or the indicator is selected. Also, the controller 110 may play back sound data in a sequence of linkage of sound data, in a sequence designated by a user, or in random sequence, when the entire playback icon is selected. The controller 110 may display a certain area of an image to which currently played back sound data is linked to be visually distinguished (for example, highlighting) when sound data is played back.

According to an embodiment of the present disclosure, the controller 110 may determine receiver information associated with a receiver that receives the image, and may preferentially play back sound data associated with the receiver information. For example, when a receiver that receives an invitation, to which greetings of a groom and a bride are linked, is a person who has a relationship with the groom, the controller 110 may preferentially play back the greetings of the groom. Conversely, when the receiver that receives the invitation, to which the greetings of the groom and the bride are linked, is a person who has a relationship with the bride, the controller 110 may preferentially play back the greetings of the bride. For example, the controller 110 may execute facial recognition when a visual sound image is received, and, when the recognized person is stored in a phone book, may preferentially play back sound data of the corresponding person. In this instance, when a plurality of persons exists in the phone book, the controller 110 may play back sound data linked to the plurality of persons based on sequence data 223. The controller 110 may sequentially play back the remaining sound data (sound data corresponding to persons who do not exist in the phone book) based on the sequence data 223.

According to an embodiment of the present disclosure, the controller 110 may link sound data with various qualities to a certain area of the image. For example, a selected certain area of an image may be linked to sound data of a low quality (for example, 48 kbps or 96 kbps), sound data of a medium quality (for example, 128 kbps or 192 kbps), and sound data of a high quality (for example, 256 kbps). Although the sound data of a low quality, the sound data of a medium quality, and the sound data of a high quality have a difference in quality of sound, they include identical sound information. To this end, the controller 110 may generate sound data with various qualities using many sampling rates when sound data to be linked to a certain area of an image is recorded. Alternatively, the controller 110 may re-encode sound data of a high quality, which is stored in advance, into sound data of a medium quality and a low quality, so as to generate sound data with various qualities.

As described above, when sound data with various qualities is linked, the controller 110 may selectively play back sound data with an appropriate quality by taking into consideration a capability of the audio processing unit 160 when playback of sound data is requested. For example, the controller 110 may select sound data of an appropriate quality, based on a type of codec that the audio processing unit 160 supports, a profile of a codec, a playback capability of a codec, or the like.

Alternatively, the controller 110 may transmit (share) a visual sound image to which sound data of an appropriate quality is linked, by taking into consideration network traffic (for example, an uploading rate) when transmission (sharing) of a visual sound image is requested. Alternatively, the controller 110 may transmit a visual sound image to which sound data of an appropriate quality is linked, by taking into consideration a capability of an audio processing unit of a partner's terminal when transmission of a visual sound image is requested. To this end, the controller 110 may request and receive information such as the type of the codec of the partner's terminal, the profile of the codec, or the like when transmission of a visual sound image is requested. Alternatively, the controller 110 may transmit a visual sound image to which sound data of an appropriate quality is linked, based on a type of a partner's terminal (for example, a mobile terminal, a PC, or the like).

According to an embodiment of the present disclosure, the controller 110 may change a slide interval based on the entire playback time of at least one piece of sound data included in each visual sound image when a slideshow of a plurality of visual sound images is played back.

According to an embodiment of the present disclosure, the controller 110 may execute a function of providing directions (e.g. navigation function). For example, the controller 110 displays a map to which at least one piece of sound data is linked, and receives a current location through the location information receiving unit 170. The controller 110 may determine whether sound data exists, that is linked to a location corresponding to the received current location information, and may play back the linked sound data when the sound data exists. The controller 110 may output a supplementary image when supplementary image data exists in the location corresponding to the current location. The supplementary image may be an actual image or an enlarged image of the predetermined location.

According to an embodiment of the present disclosure, the controller 110 may compose sound data linked to each image when a plurality of visual sound images are composed. Similarly, when a visual sound image is edited, the controller 110 may edit sound data together. For example, when one area to which sound data is linked is cut or copied from a visual sound image in which sound data is linked to each of three areas, the controller 110 may cut or copy sound data linked to the area that is cut or copied from the entire sound data.

According to an embodiment of the present disclosure, the controller 110 may designate sound data included in a visual sound image as a sound effect that indicates reception of an event related to a person to whom the sound data is linked (reception of a call, a text message, an instant message (IM), or the like). A description thereof will be described below with reference to FIG. 11.

The storage unit 120 may store an operating system (OS) of the electronic device 100 and application programs necessary for other optional functions, such as a sound reproduction function, an image or video reproduction function, a broadcast reproduction function, an Internet access function, a text message function, a map service function, and the like. Also, the storage unit 120 may store various data, for example, phone book data, video data, game data, music data, movie data, map data, and the like.

The storage unit 120 may store a control program for controlling a procedure of generating, editing, and playing back a visual sound image.

The storage unit 120 may store a facial recognition database (not illustrated) for recognizing a person included in an image, and a speaker recognition database (not illustrated) for recognizing a speaker.

The facial recognition database may store facial feature information of a person. The speaker recognition database may store tone color information of a person.

The storage unit 120 according to an embodiment of the present disclosure may store a visual sound image in which sound data is linked to a certain area of an image. Here, a data structure of a visual sound image will be described with reference to FIGS. 2 and 3.

Referring to FIG. 2, the visual sound image may be formed of image data 210, information data 220, and sound data 230. The information data 220 may include position data 221 indicating location information of a selected certain area in an image, contact data 222 indicating phonebook information of a subject (person) included in the selected certain area, and sequence data 223 indicating a sequence of playback of sound data. The sequence data 223 may be a sequence of linkage of sound data. The sequence data 223 may be changed by a user.

The information data 220 and the sound data 230 may exist in equal number as the number of areas selected by a user. For example, FIG. 2 is a data structure when information data 220 and sound data 230 are linked to each of the three areas of an image. FIG. 2 illustrates the case in which the image data 210 is JPEG data and the sound data 230 is PCM data. However, the image data 210 and the sound data 230 according to an embodiment of the present disclosure may be provided in various formats.

Referring to FIG. 3, the visual sound image may be stored in a portable network graphics (PNG) format. A general PNG structure may include a PNG signature 310 and a chunk. The chunk may include a critical chunk 320 and an ancillary chunk 330.

The PNG structure of a visual sound image according to an embodiment of the present disclosure may include a PNG original field 340 and a sound data chunk field 350. The PNG original field 340 may include the PNG signature 310 and the critical chunk 320. The sound data chunk field 350 may be an ancillary chunk field. The sound data chunk field 350 may include a length field of 4 bytes, a chunk type field of 4 bytes, a chunk data field of bytes designated by the length field, and a cyclic redundancy check (CRC) field of 4 bytes. The visual sound image of the PNG format may be used for transmission through an IM or an MMS.

The touch screen 130 may perform an input function and a display function. To this end, the touch screen 130 may include the display unit 131 and the touch detection unit 132.

The display unit 131 displays information input by a user or information to be provided to the user as well as various menus of the electronic device 100. The display unit 131 may be embodied as a liquid crystal display (LCD), an organic light emitted diode (OLED), an active matrix organic light emitted diode (AMOLED), or the like. The display unit 131 may provide various screens according to the use of the electronic device 100, for example, a home screen, a menu screen, a webpage screen, a call screen, and the like. The display unit 131 according to an embodiment of the present disclosure may display various screens such as the following described examples of a screen.

The touch detection unit 132 is a device for providing an input function, and may generate a touch event and transmit the generated touch event to the controller 110 when a touch input means, such as a user's finger, a stylus pen, an electronic pen, or the like, contacts or approaches the touch detection unit 132. For example, the touch detection unit 132 may recognize the occurrence of a touch event based on a change in a physical quantity (for example, capacitance, resistance, and the like) according to a contact or approach by the touch input means. Also, the touch detection unit 132 may further include a touch panel of an electromagnetic inductive type, for recognizing an electronic pen of an electromagnetic inductive type. The touch detection unit 132 as described above is apparent to those skilled in the art, and thus, a description thereof will be omitted.

The touch detection unit 132 according to an embodiment of the present disclosure may detect the input of various touch signals for controlling generation, editing, and playback of a visual sound image, and may transmit the detected touch signal to the controller 110.

The camera unit 140 is a device for photographing a subject, which may convert an image generated by photographing the subject to an electrical signal and store the electrical signal as digital data. The camera unit 140 may be embodied as a charge coupled device (CCD) image sensor or a complementary metal oxide semiconductor (CMOS) image sensor. The camera unit 140 may support an image photographing function and a video photographing function. The camera unit 140 according to an embodiment of the present disclosure may support a sound shot photographing mode. The sound shot photographing mode is a photographing mode that is capable of linking sound data to a photographed image. The camera unit 140 according to an embodiment of the present disclosure may include a front camera (not illustrated) that is installed in the front side (a side where the display unit 131 is included) of the electronic device 100 and a rear camera (not illustrated) that is installed in the back side of the electronic device 100. The front camera according to an embodiment of the present disclosure may be used for tracking a line of sight of a photographer when a sound shot photographing mode is used.

According to an embodiment of the present disclosure, the electronic device 100 may further include a line-of-sight tracking camera separately for tracking a line of sight of a photographer. Alternatively, the electronic device 100 may work together with a separate electronic device that is capable of tracking a line of sight of a photographer (for example, a wearable electronic device provided in a form of glasses), so as to receive line-of-sight information of the photographer from the separate electronic device.

The communication unit 150 may support a wired and/or wireless communication function of the electronic device 100. For example, the communication unit 150 may include a mobile communication module that supports a mobile communication function (for example, mobile communication in 3G or 4G), a wireless LAN communication module that supports a short-range wireless communication function, a Bluetooth communication module, an infrared communication module, a Zigbee communication module, and a USB communication module that supports a wired communication function, and the like. The communication unit 150 according to an embodiment of the present disclosure may transmit or receive a visual sound image to/from another electronic device, under a control of the controller 110. Alternatively, the communication unit 150 may receive line-of-sight information of a photographer from a wearable electronic device (not illustrated), and transmit the same to the controller 110.

The audio processing unit 160 may be connected with a speaker for outputting an audio signal transmitted/received during a call, an audio signal included in a received message, or an audio signal according to a reproduction of an audio file stored in the storage unit 120 and a microphone for collecting a voice of the user or other audio signals. The audio processing unit 160 according to an embodiment of the present disclosure may collect sound data to be linked to a certain area of an image through at least one microphone (MIC), or may output sound data linked to a certain area of an image through the speaker (SPK).

The location information receiving unit 170 may determine a current location of the electronic device 100 through various methods. For example, the location information receiving unit 170 may determine the current location of the electronic device 100 through a satellite navigation system such as a global positioning system (GPS), a global navigation satellite system (GNSS), GALILEO, or the like. Alternatively, the location information receiving unit 170 may determine the current location of the electronic device 100 through triangulation that calculates a location using a wireless signal received from a plurality of base stations, for example, three or more base stations. Alternatively, the location information receiving unit 170 may determine the current location of the electronic device 100 using neighboring access points (APs) of which locations are known. The method of determining the location of the electronic device 100 is a publically known technology and it is apparent to those skilled in the art and thus, descriptions thereof will be omitted.

Although not illustrated in FIG. 1A, the electronic device 100 may selectively further include component elements such as various sensor modules, like a broadcasting reception module for receiving broadcastings, a digital sound source playback module such as an MP3, an infrared sensor module, an illumination sensor module, a motion sensor module, and the like. Alternatively, the electronic device 100 according to an embodiment of the present disclosure may further include component elements in an equivalent level to the above described component elements.

Figure 4:
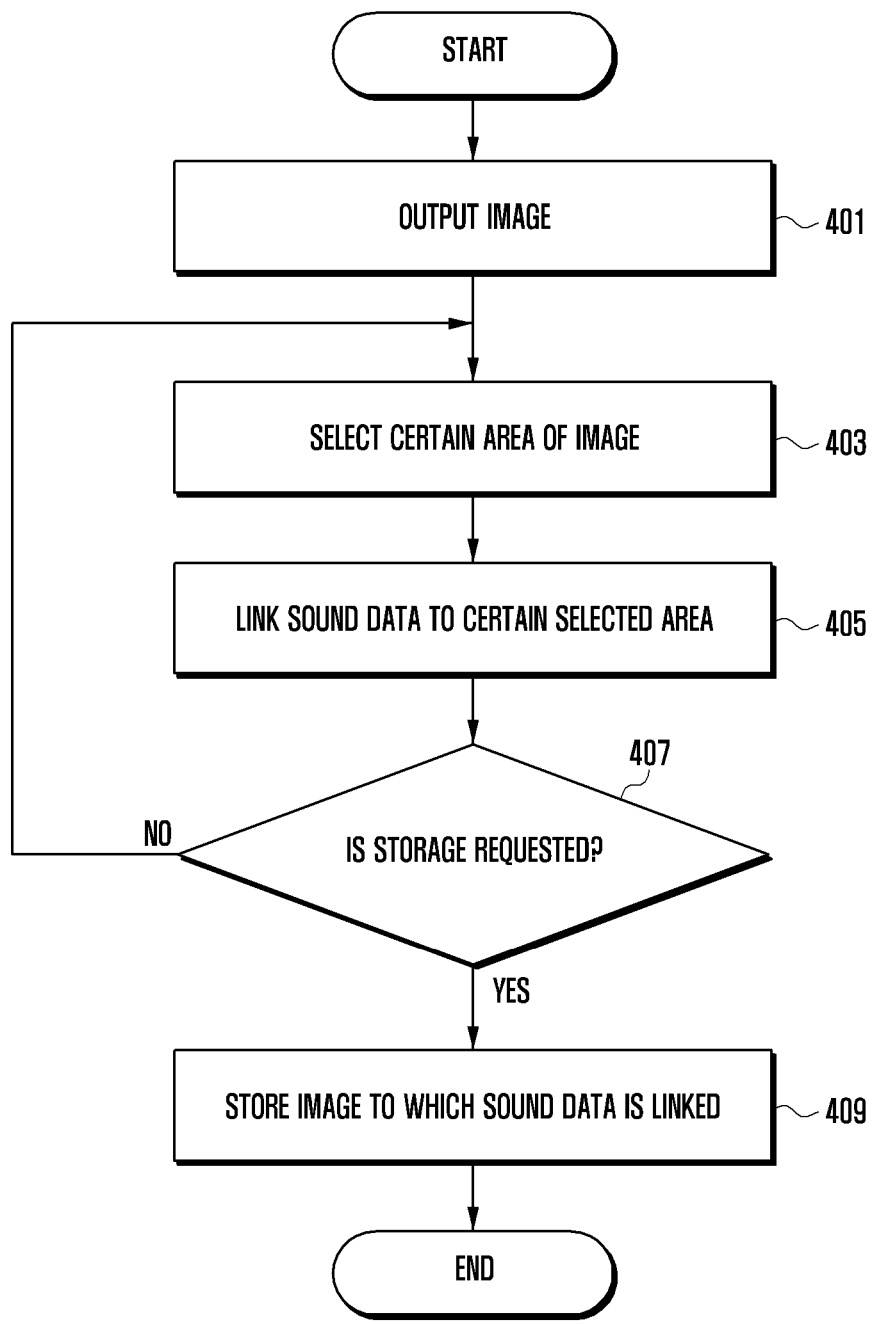
FIG. 4 is a flowchart illustrating a method of generating a visual sound image of an electronic device according to an embodiment of the present disclosure.

FIG. 4 is a flowchart illustrating a method of generating a visual sound image of an electronic device according to an embodiment of the present disclosure.

Referring to FIG. 4, the controller 110 of the electronic device 100 according to an embodiment of the present disclosure may output an image in operation 401. The image may be an image stored in the storage unit 120 of the electronic device 100 in advance through photographing or downloading, or a preview image for photographing an image. The image may include at least one object. The object may be a subject such as a person, an animal, a building, a doll, a monitor, a car, or the like.

The controller 110 may detect a selection of a certain area in the output image, in operation 403. The certain area may be at least a part of the object, at least a part of an area where an object does not exist in the image, or at least a part of a background of the image.

The certain area may be selected by a user, or may be automatically selected by the area selecting unit 111 of the controller 110. For example, a user may draw a closed curve or an open curve (e.g., an uncompleted closed curve) to enable a predetermined subject of the output image to be included. Alternatively, the area selecting unit 111 may select a certain area of an image, through detection or recognition of a subject, detection of a direction where a sound occurs, tracking a lip, tracking a line of sight, recognition of a speaker, and the like. The method of selecting a certain area of an image will be described later with reference to FIGS. 8A to 8H.

The controller 110 may link sound data to the selected certain area, in operation 405. To the selected certain area, one of sound data stored in the storage unit 120, sound data newly generated using a recording function, and address information of a webpage where sound data exists may be linked.

When the linkage of the sound data is completed, the controller 110 may determine whether storage is requested in operation 407. The storage may be requested through a separate menu (or key).

When the storage is not requested, the controller 110 may return to operation 403. That is, the controller 110 may detect a selection of another certain area of the image, and may link sound data to the selected other certain area.

Conversely, when the storage is requested, the controller 110 may proceed with operation 409, and may store an image (a visual sound image) in which sound data is linked to the selected certain area.

According to an embodiment of the present disclosure, the controller 110 may automatically store a visual sound image when the linkage of sound data is completed, even without a separate request for storage.

FIGS. 5A to 5E are diagrams illustrating screens in association with a method of generating a visual sound image using a stored image according to an embodiment of the present disclosure.

Figure 5A:
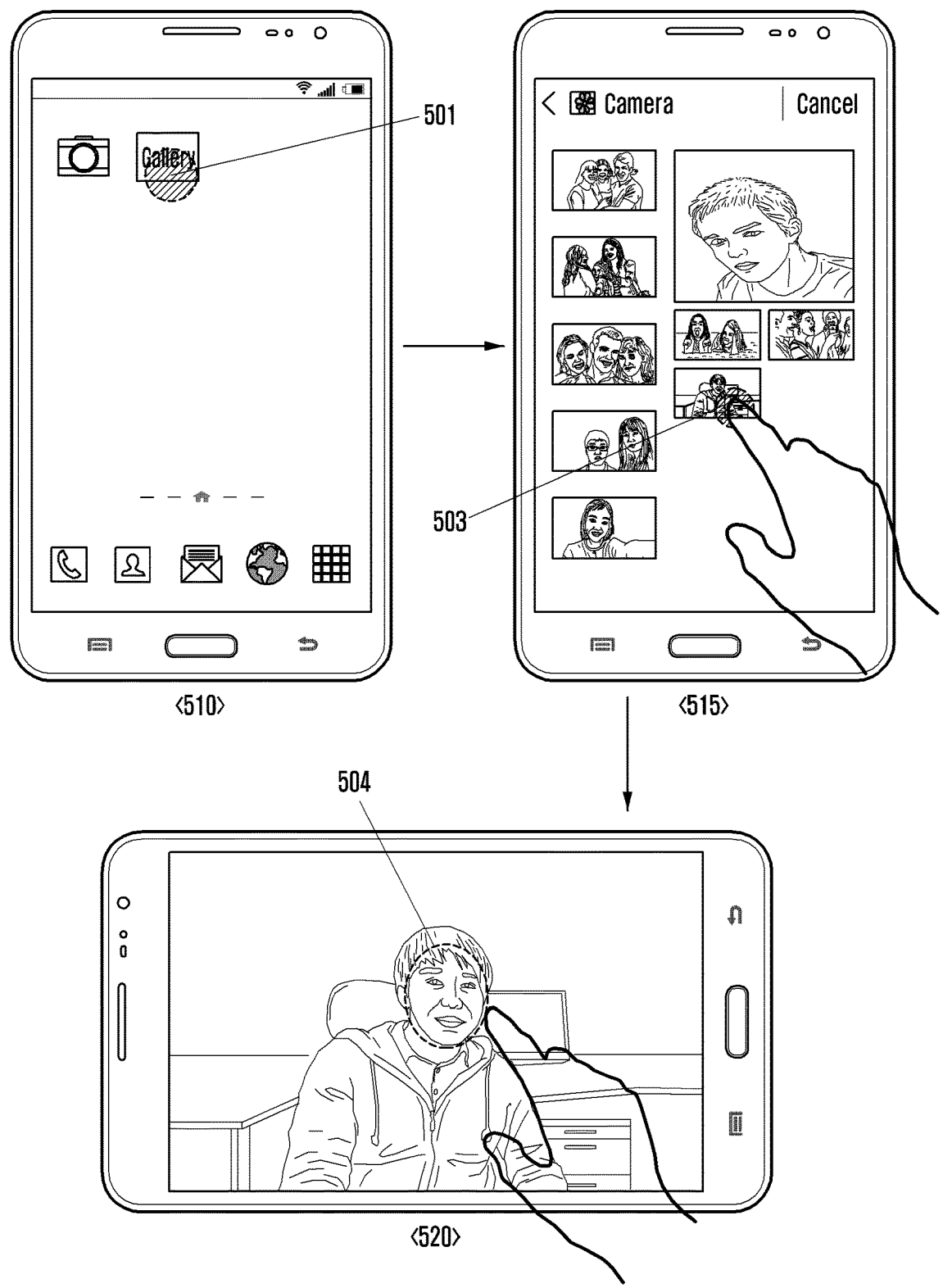
FIGS. 5A, 5B, 5C, 5D, and 5E are diagrams illustrating screens in association with a method of generating a visual sound image using a stored image according to an embodiment of the present disclosure.

Referring to FIGS. 5A to 5E, an electronic device according to an embodiment of the present disclosure may detect a selection of a gallery icon 501 that requests displaying a list of stored images, as shown in the drawing of the reference numeral 510 of FIG. 5A. When the selection of the gallery icon 501 is detected, the electronic device may output a list of the stored images as shown in the drawing of reference numeral 515 of FIG. 5A. For example, the electronic device may output a list of images in a form of a thumbnail.

When a single image 503 is selected from the list, the electronic device may output the selected image 503 as shown in the drawing of the reference numeral 520 of FIG. 5A.

The electronic device may detect a selection of a certain area 504 of the image 503. For example, the electronic device may detect a selection of the certain area 504 of the image 503 through a user gesture detected in the image 503, as shown in the drawing of the reference numeral 520 of FIG. 5A.

Figure 5B:
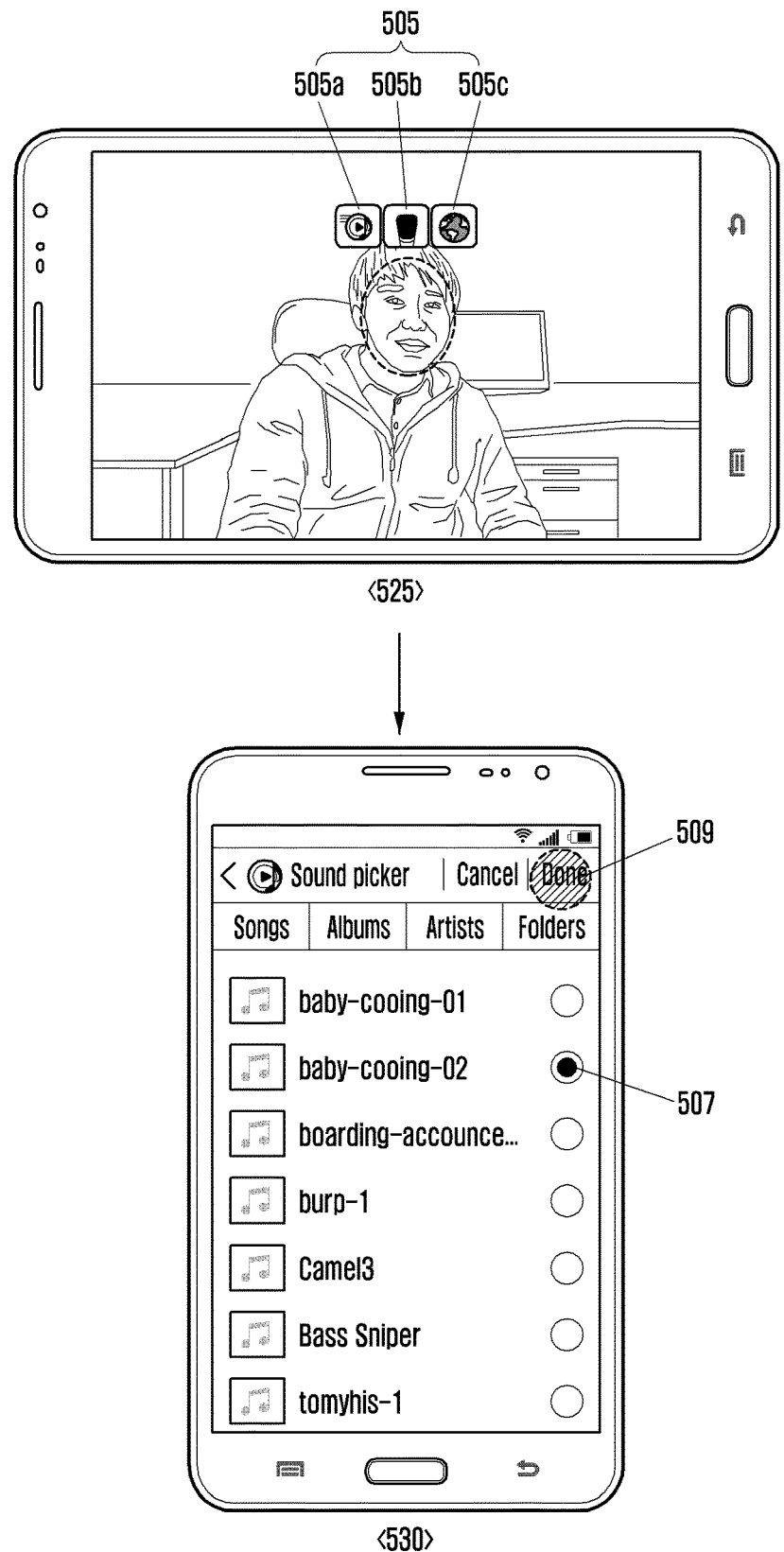

When the selection of the certain area 504 of the image 503 is detected, the electronic device may output a function menu 505 for linking sound data as shown in the drawing of the reference numeral 525 of FIG. 5B. The function menu 505 may include a first menu 505*a* for linking one of sound data stored in advance, a second menu 505*b* for linking new sound data through a recording function, and a third menu 505*c* for linking address information of a webpage where sound data is located. The function menu 505 may be displayed around the selected certain area 504.

When the first menu 505*a* is selected from the function menu 505, the electronic device may output a list of sound data stored in advance, as shown in the drawing of the reference numeral 530 of FIG. 5B.

Figure 5C:
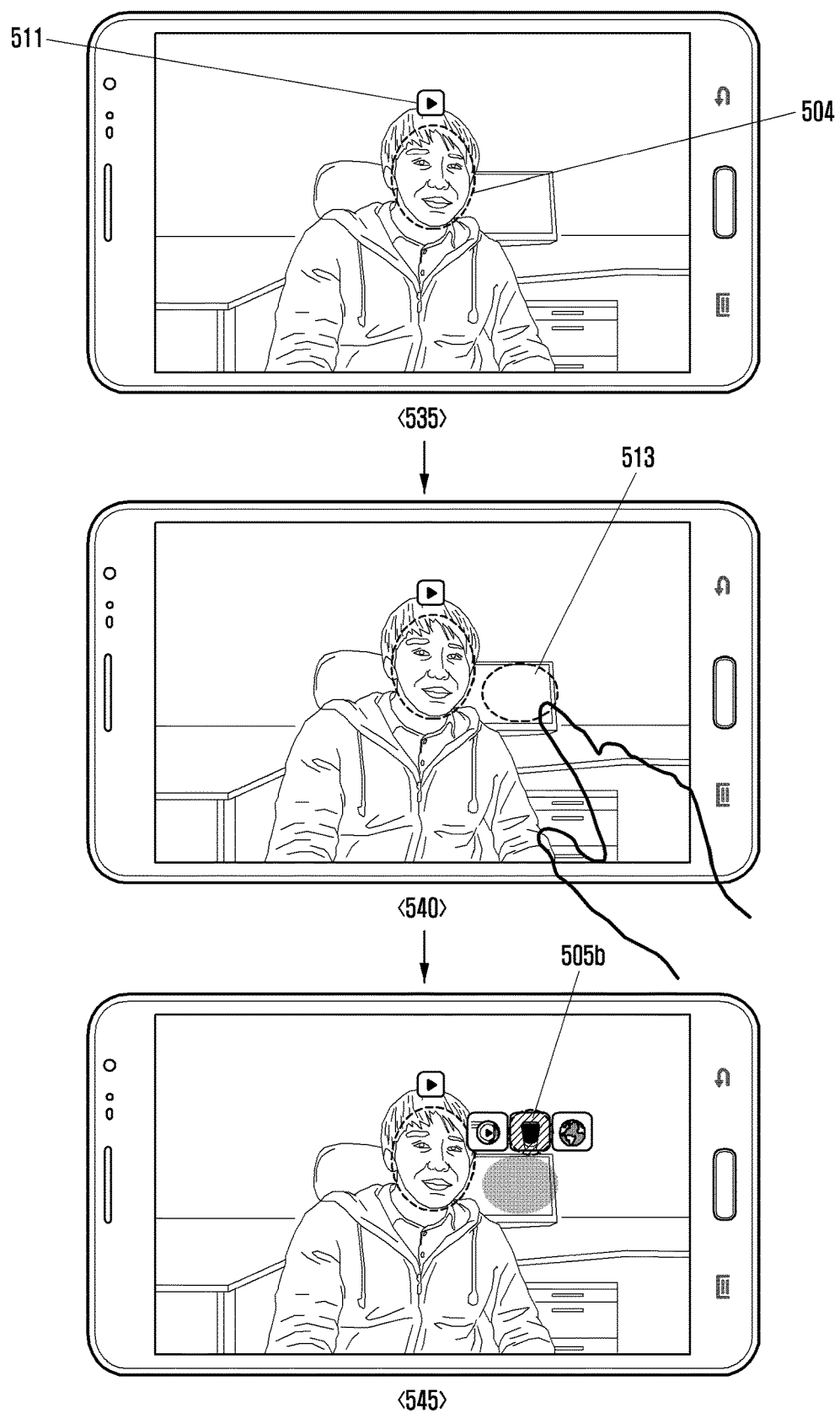

In the state of the drawing of the reference numeral 530 of FIG. 5B, when a predetermined piece of sound data 507 is selected and a selection complete menu 509 is input, the electronic device returns to a screen that displays the selected image 503 as shown in the drawing of the reference numeral 535 of FIG. 5C, and may display a first notification icon 511 indicating that sound data exists around the selected certain area 504 of the image 503. The first notification icon 511 may be displayed as a symbol, a picture, an image, text, or the like. Although not illustrated, the selected certain area may be displayed to be visually distinguished from another area that is not selected.

The electronic device may detect a selection of another area 513 of the image 503, as shown in the drawing of the reference numeral 540 of FIG. 5C. When the selection of the other area 513 is detected, the electronic device may output the function menu 505 as shown in the drawing of the reference numeral 545 of FIG. 5C. When the second menu 505b is selected from the function menu 505, the electronic device may output a screen for implementing a recording function (hereinafter referred to as a recording waiting screen) as shown in the drawing of the reference numeral 550 of FIG. 5D. The recording waiting screen may include a list 514a of files recorded in advance and a recording icon 514b for requesting beginning of recording.

Figure 5D:
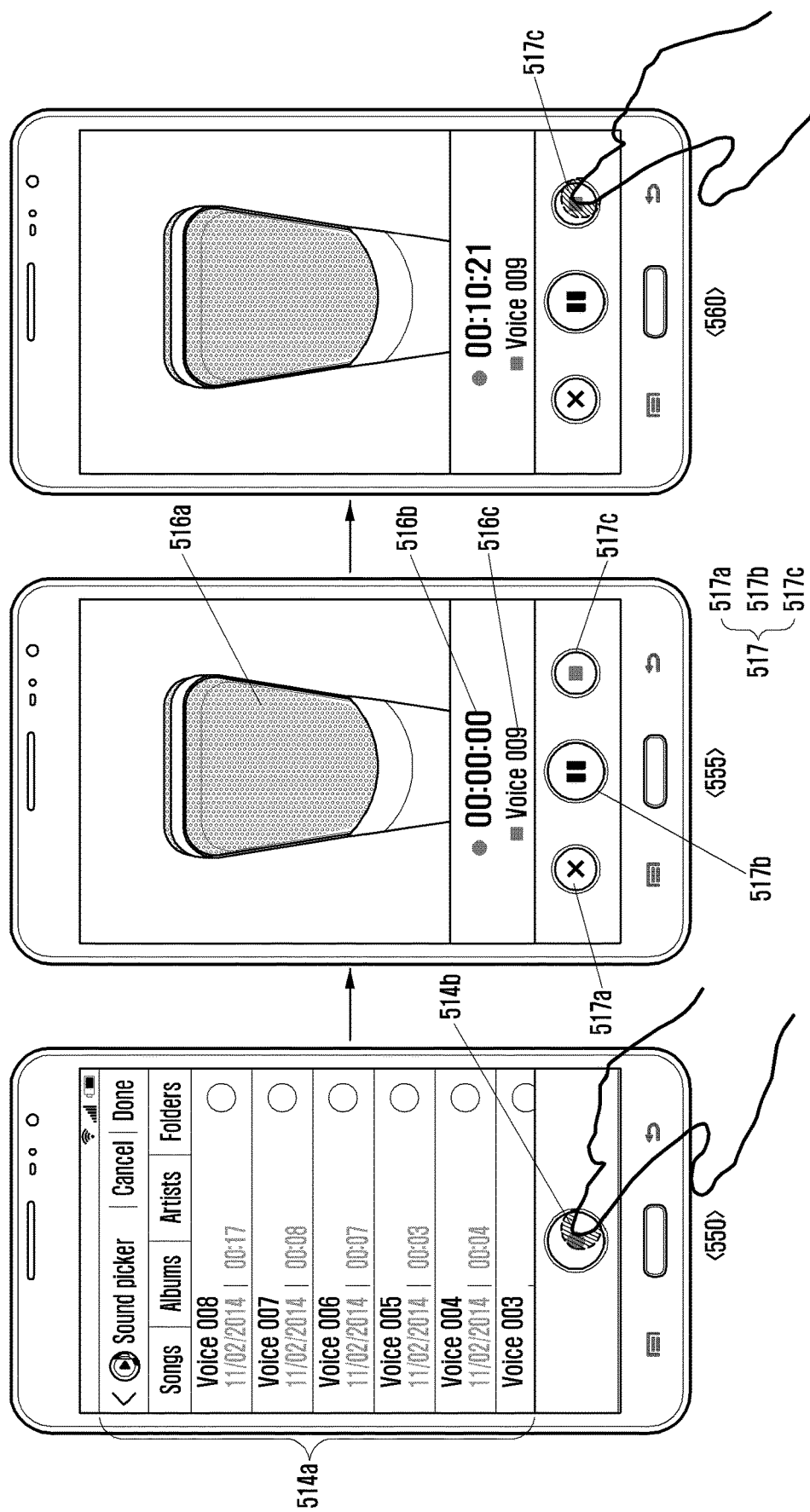

When the recording icon 514b is selected in the drawing of the reference numeral 550, the electronic device may display a recording execution screen where recording is executed as shown in the drawing of the reference numeral 555 of FIG. 5D. For example, the recording execution screen may include a microphone image 516a, a timer 516b indicating a recording time, a title 516c of a recording file, and a recording control menu 517. The recording control menu 517 may include a cancel menu 517a, a pause menu 517b, and a recording termination menu 517c.

Figure 5E:
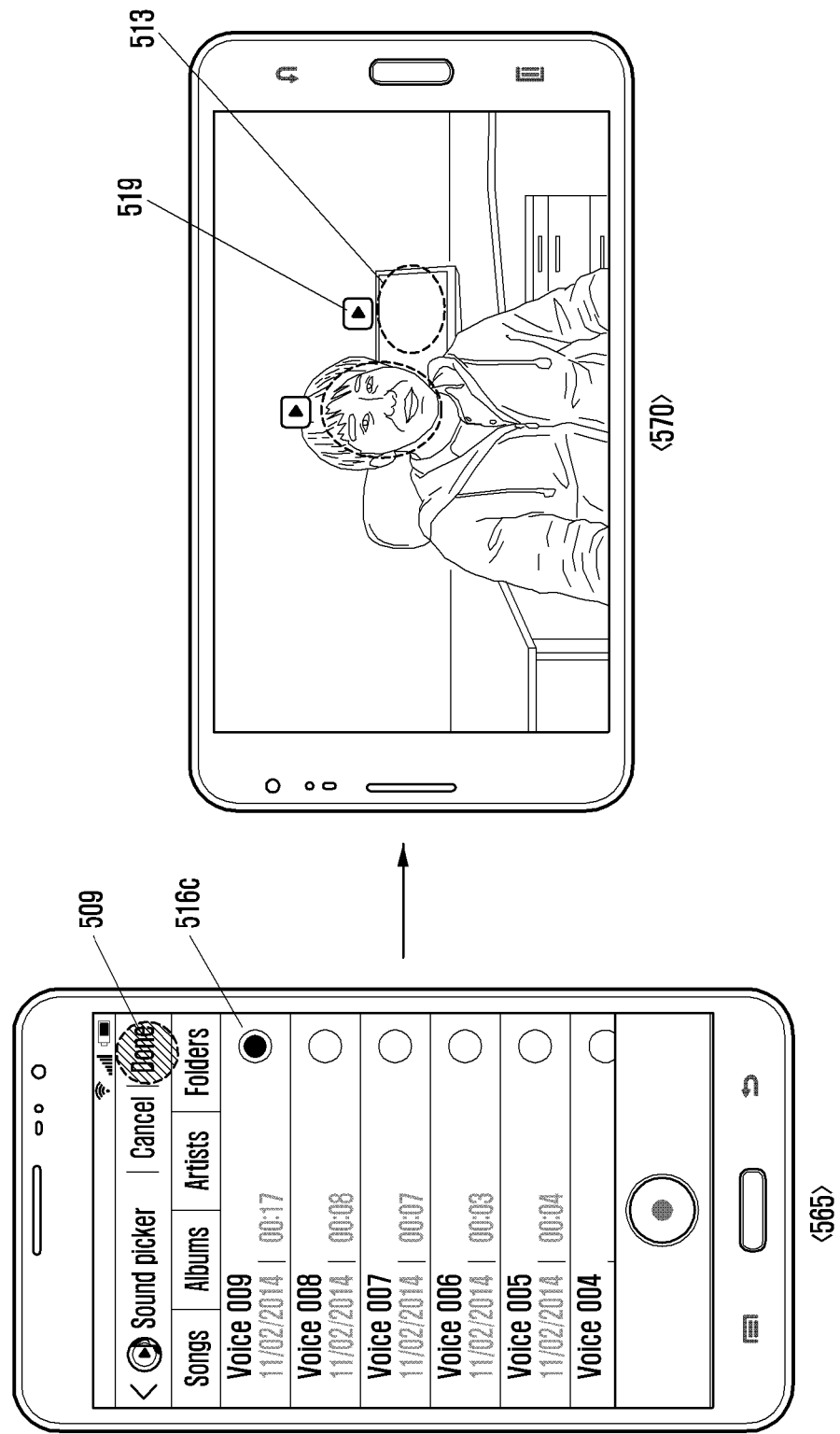

As shown in the drawing of the reference numeral 560 of FIG. 5D, when the recording termination menu 517c is input, the electronic device terminates recording, and returns to a recording waiting screen as shown in the drawing of the reference numeral 565 of FIG. 5E. In this instance, the newly generated recording file 'Voice 009' 516c may be displayed in the top of the list, in a state of being selected.

When the selection complete menu 509 is input in the drawing of the reference numeral 565 of FIG. 5E, the electronic device may return to a screen that displays the selected image 503 as shown in the drawing of the reference numeral 570 of FIG. 5E, and may display the second notification icon 519 around the other area 513 of the image 503.

Figure 6A:
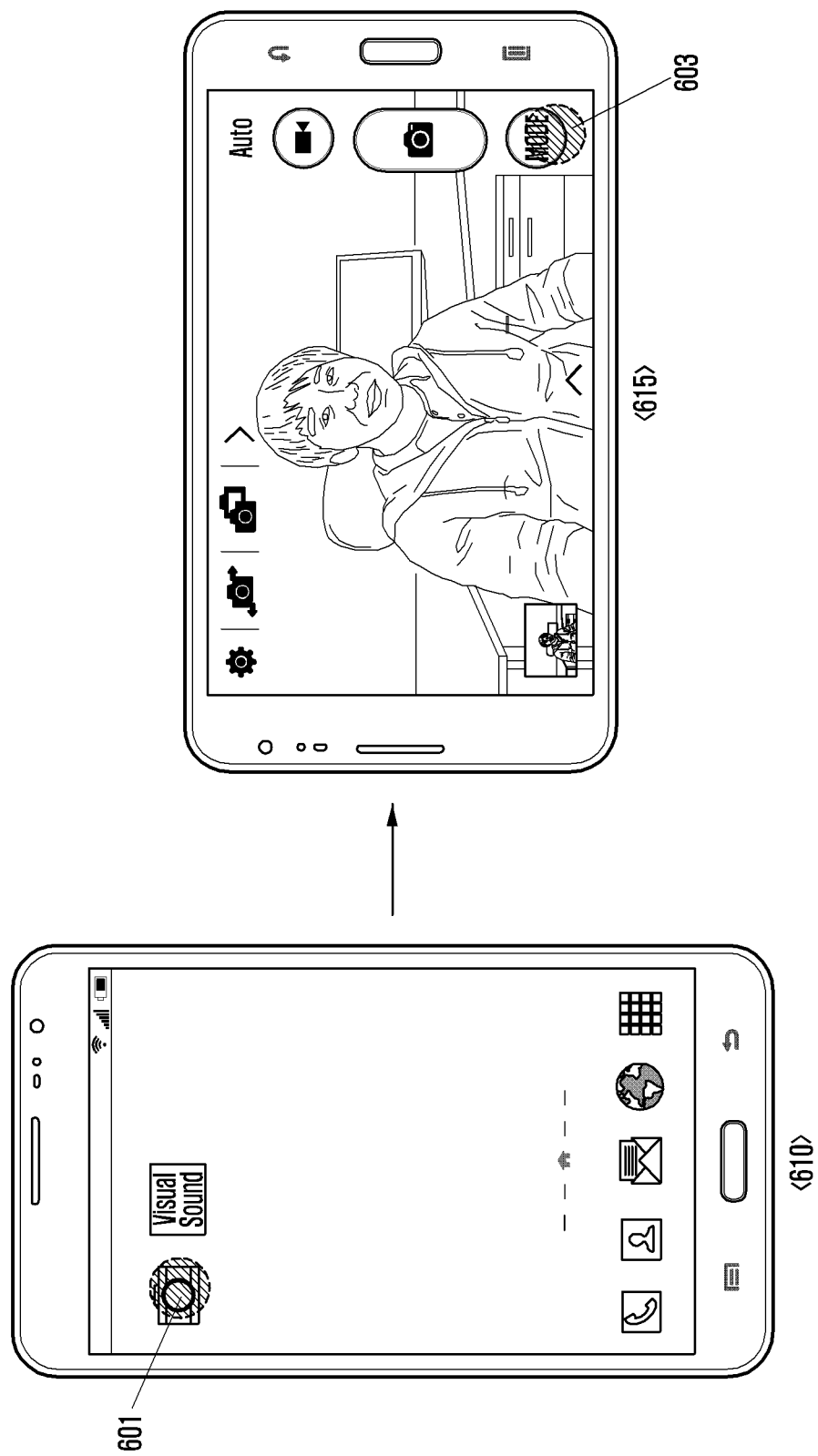
FIGS. 6A, 6B, and 6C are diagrams illustrating screens in association with a method of generating a visual sound image using a photographing function according to an embodiment of the present disclosure.
Figure 6B:
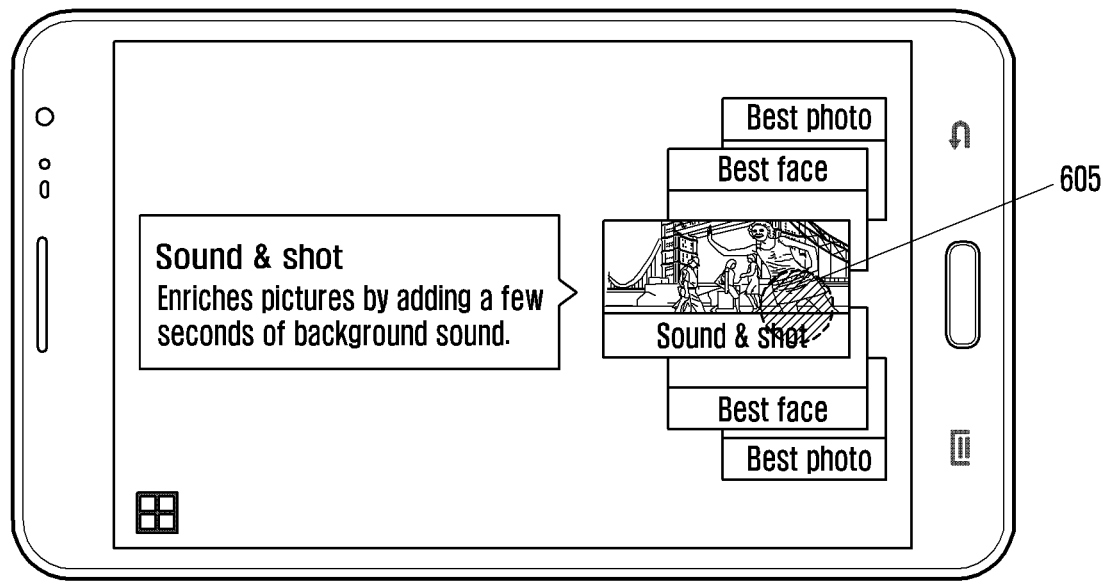
Figure 6B:
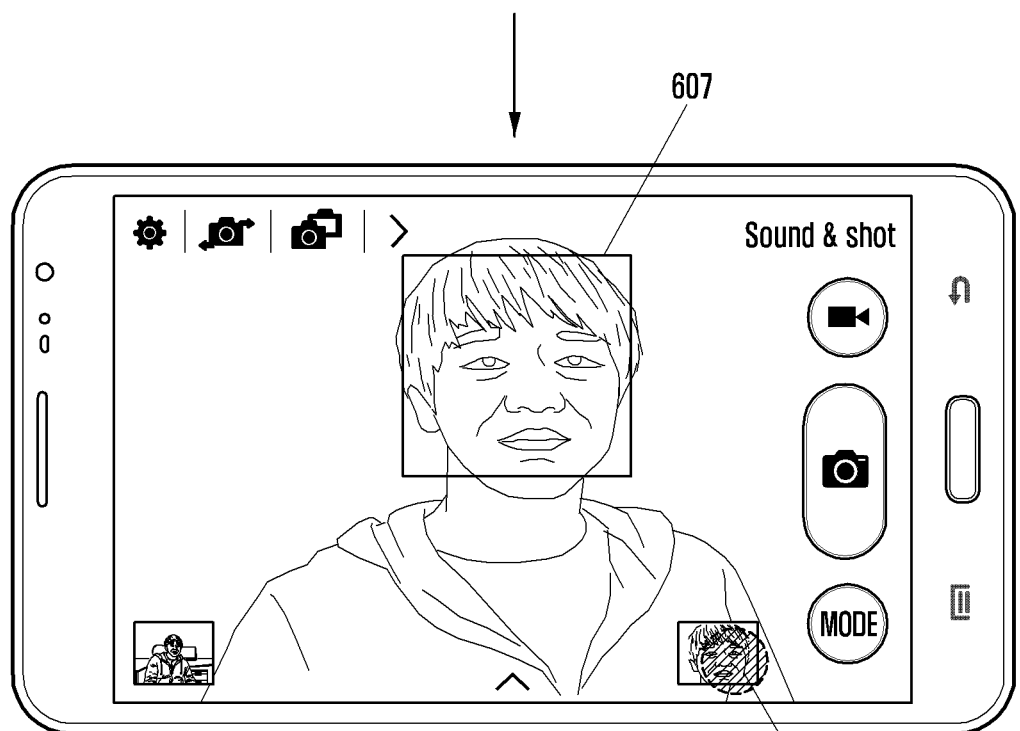
Figure 6C:
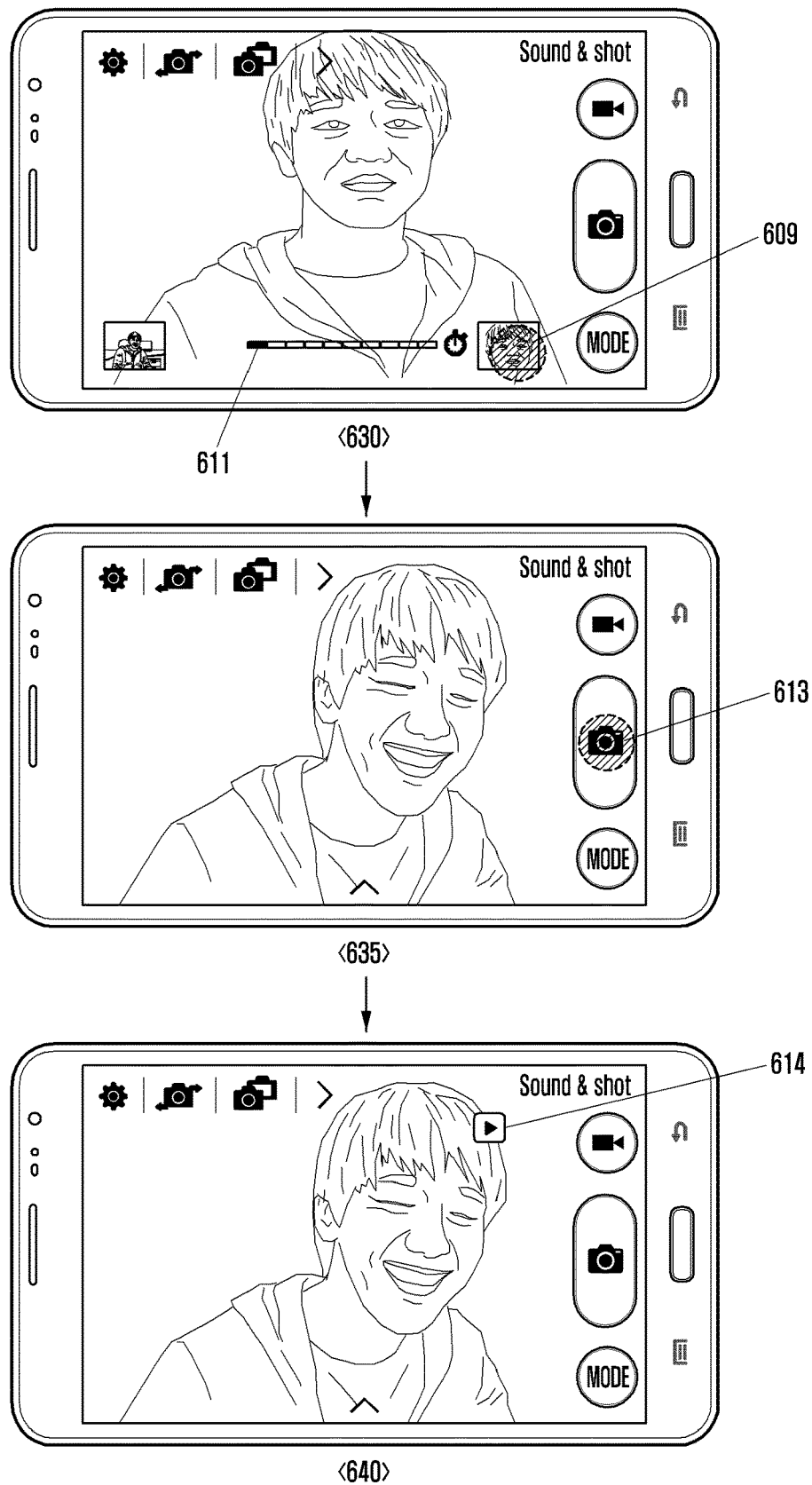

FIGS. 6A to 6C are diagrams illustrating screens in association with a method of generating a visual sound image using a photographing function according to an embodiment of the present disclosure.

Referring to FIGS. 6A to 6C, an electronic device according to an embodiment of the present disclosure may detect a selection of a camera icon 601, as shown in the drawing of the reference numeral 610 of FIG. 6A. When the selection of the camera icon 601 is detected, the electronic device may output a preview screen, as shown in the drawing of the reference numeral 615 of FIG. 6A.

When a mode menu 603 is selected in the preview screen, the electronic device may display various photographing modes supported by the electronic device, in one side of the preview screen, as shown in the drawing of the reference numeral 620 of FIG. 6B.

When a sound shot mode 605 is selected out of the various photographing modes, the electronic device may output a preview screen of the sound shot mode, as shown in the drawing of the reference numeral 625 of FIG. 6B.

As shown in the drawing of the reference numeral 625 of FIG. 6B, when a selection of a recording request menu 609 that requests recording is detected, in the state in which an area 607 to which sound data is to be linked is selected, the electronic device may execute a recording function as shown in the drawing of the reference numeral 630 of FIG. 6C. The recording request menu 609 may display an image of the area 607 to which the sound data is to be linked. For example, when the electronic device photographs a person, the electronic device detects a face of the person through a facial detection function and may set the detected face of the person as an area to which sound is to be linked. In this instance, the recording request menu 609 may display the face of the person.

According to an embodiment of the present disclosure, when a plurality of persons is detected in a preview screen, the electronic device may display a plurality of recording request menus. A user may select one of the plurality of recording request menus, and may link sound data to a facial area of a person corresponding to the selected recording request menu. Alternatively, when a plurality of persons is detected in a preview screen, the electronic device may display an image of a focused person or an image of a person selected by the user, in a recording request menu.

According to an embodiment of the present disclosure, when a subject (for example, a person) is detected in a preview screen, the electronic device may recognize a subject through a subject recognition function and may display information associated with the subject. For example, when the subject is a person, the electronic device may recognize a person through a facial recognition function, and may display a name or a nickname of the corresponding person when the corresponding person is stored in a phonebook. In this instance, when a touch on the facial area or the name (or nickname) of the person is detected in the preview screen, the controller 110 may execute a recording function.

Referring to the drawing of the reference numeral 630 of FIG. 6C, when the recording function is executed by selecting the recording request menu 609, the electronic device may display a graph 611 indicating an available recording time and a recording time, in one side of the preview screen. Here, an embodiment of the present disclosure may limit the available recording time by taking into consideration a capacity of data. However, another embodiment of the present disclosure may not limit the available recording time.

When the recording request menu 609 is reselected, the electronic device may terminate recording. As shown in the drawing of the reference numeral 635 of FIG. 6C, when a photographing menu 613 is selected after recording is completed, the electronic device may photograph a subject.

When photographing of the subject is completed, the electronic device may output a photographed image, as shown in the drawing of the reference numeral 640 of FIG. 6C. In this instance, the photographed image may include a notification icon 614.

The embodiments of the present disclosure according to FIGS. 6A to 6C may generate sound data to be linked, before photographing a subject.

Figure 7A:
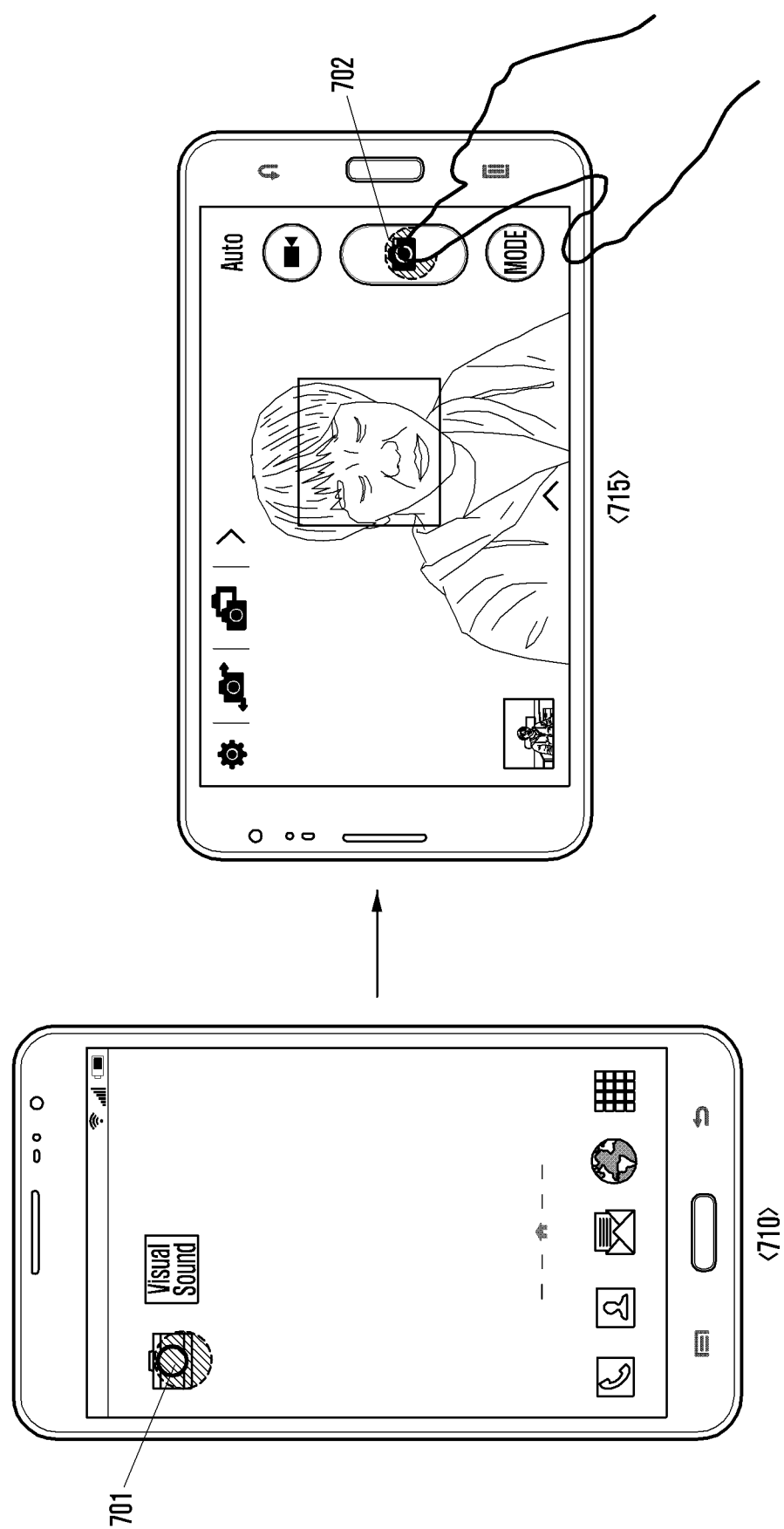
FIGS. 7A and 7B are diagrams illustrating screens in association with a method of generating a visual sound image using a photographing function according to an embodiment of the present disclosure.
Figure 7B:
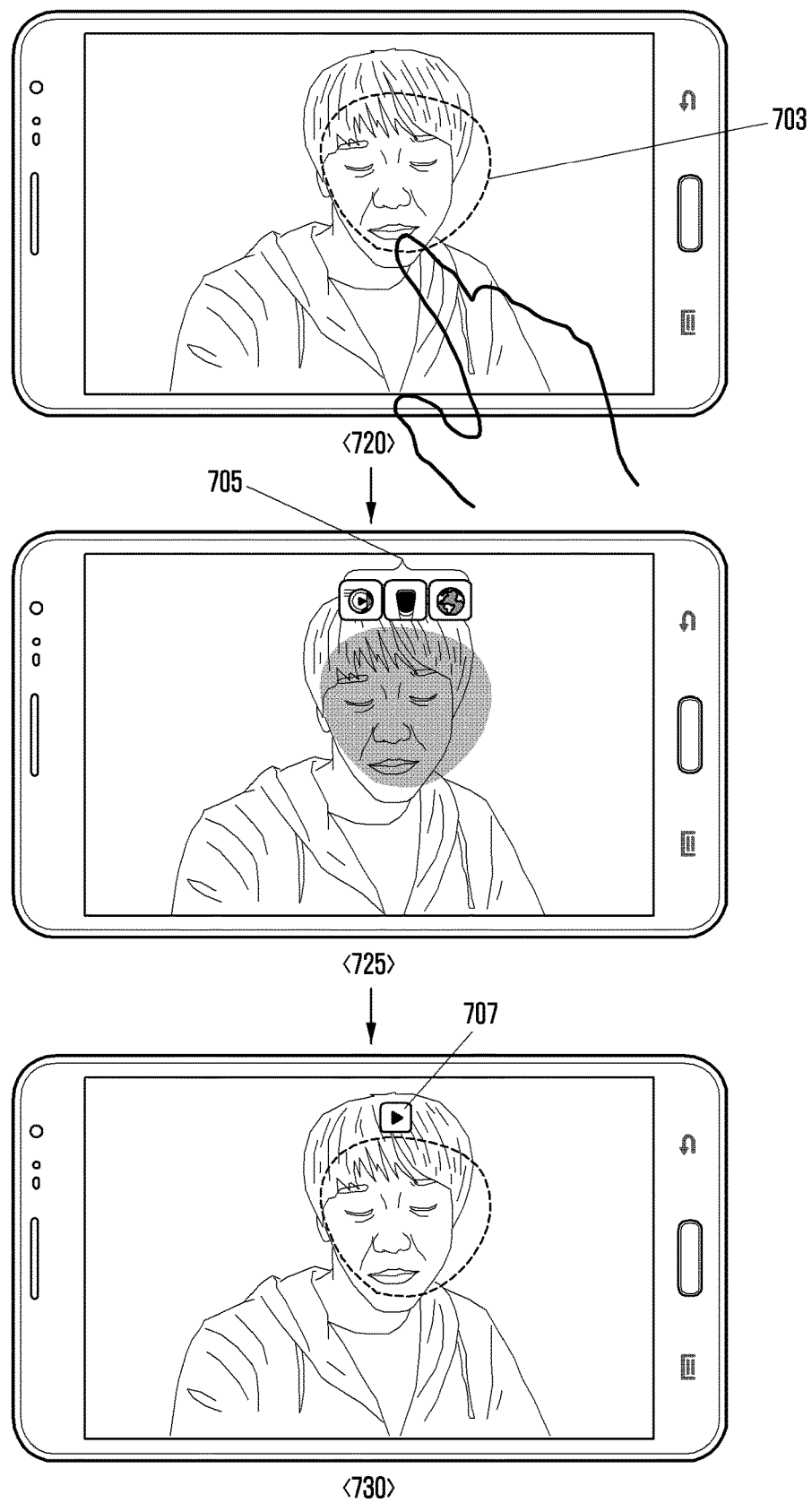

FIGS. 7A and 7B are diagrams illustrating screens in association with a method of generating a visual sound image using a photographing function according to an embodiment of the present disclosure.

Referring to FIGS. 7A and 7B, an electronic device according to an embodiment of the present disclosure may detect a selection of a camera icon 701, as shown in the drawing of the reference numeral 710 of FIG. 7A. When the selection of the camera icon 701 is detected, the electronic device may output a preview screen, as shown in the drawing of the reference numeral 715 of FIG. 7A.

When the photographing menu 702 is selected in the preview screen, the electronic device may photograph a subject, and may output a photographed image. In this instance, a user may select a certain area 703 of the photographed image, as shown in the drawing of the reference numeral 720 of FIG. 7B. Here, the certain area 703 of the photographed image may not be limited to an area selected by a gesture of the user, and may be selected through the various following described methods.

When the selection of the certain area 703 of the image is detected, the electronic device may output a function menu 705 as shown in the drawing of the reference numeral 725 of FIG. 7B. Sound data may be linked to the certain area 703 of the photographed image, through the function menu 705. Here, the method of linking sound data using the function menu 705 has been described through FIGS. 5A to 5E and thus, the description thereof will be omitted.

When the linkage of the sound data is completed, the electronic device may display a notification icon 707 in one side of the photographed image, as shown in the drawing of the reference numeral 730 of FIG. 7B.

The embodiments of the present disclosure according to FIGS. 7A and 7B may link sound data after photographing a subject.

FIGS. 8A to 8H are diagrams illustrating screens in association with a method of selecting a certain area of an image according to an embodiment of the present disclosure.

Figure 8A:
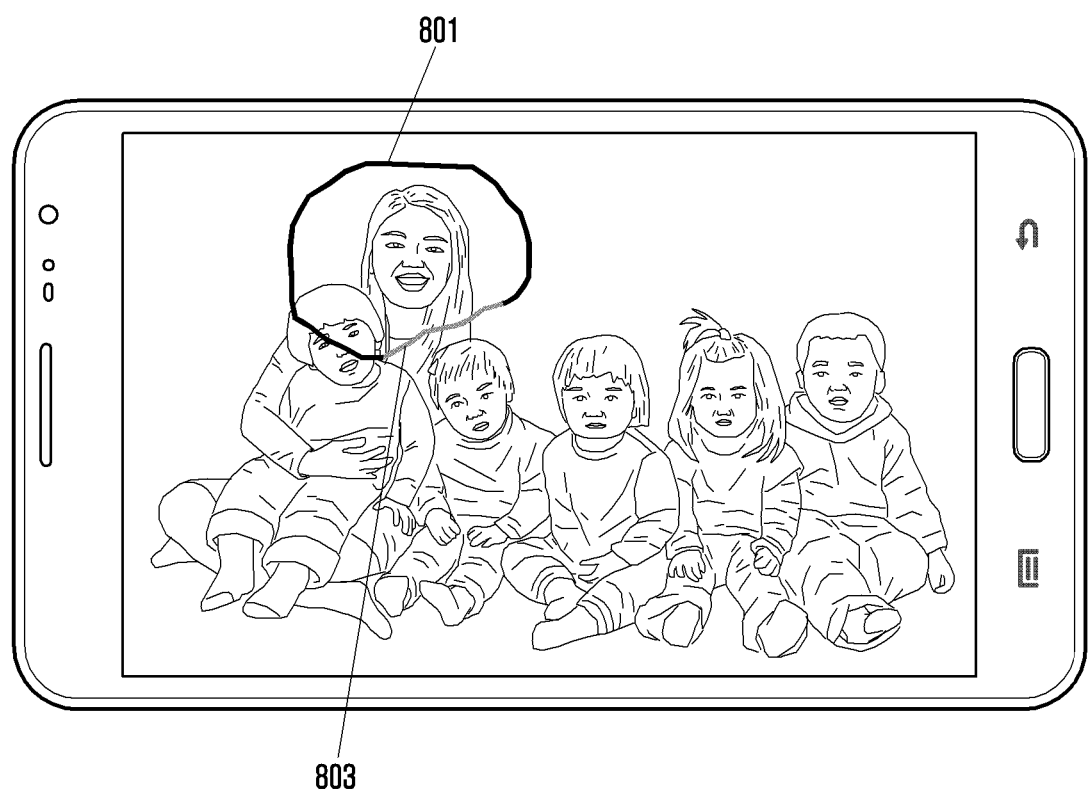

Referring to FIG. 8A, an electronic device according to an embodiment of the present disclosure, may select a certain area of an image based on a gesture of a user. For example, the user may draw a figure (for example, a circle) on an image using a finger, a touch input means (for example, stylus), or the like. The feature may be a closed curve or an open curve (uncompleted closed curve). For example, the electronic device may automatically draw the remaining part 803 to make a complete closed curve although the user draws an uncompleted closed curve 801, as shown in FIG. 8A.

As described above, an embodiment of the present disclosure may select (designate) a certain area of an image to which sound data is to be linked, based on a gesture of the user.

Figure 8B:
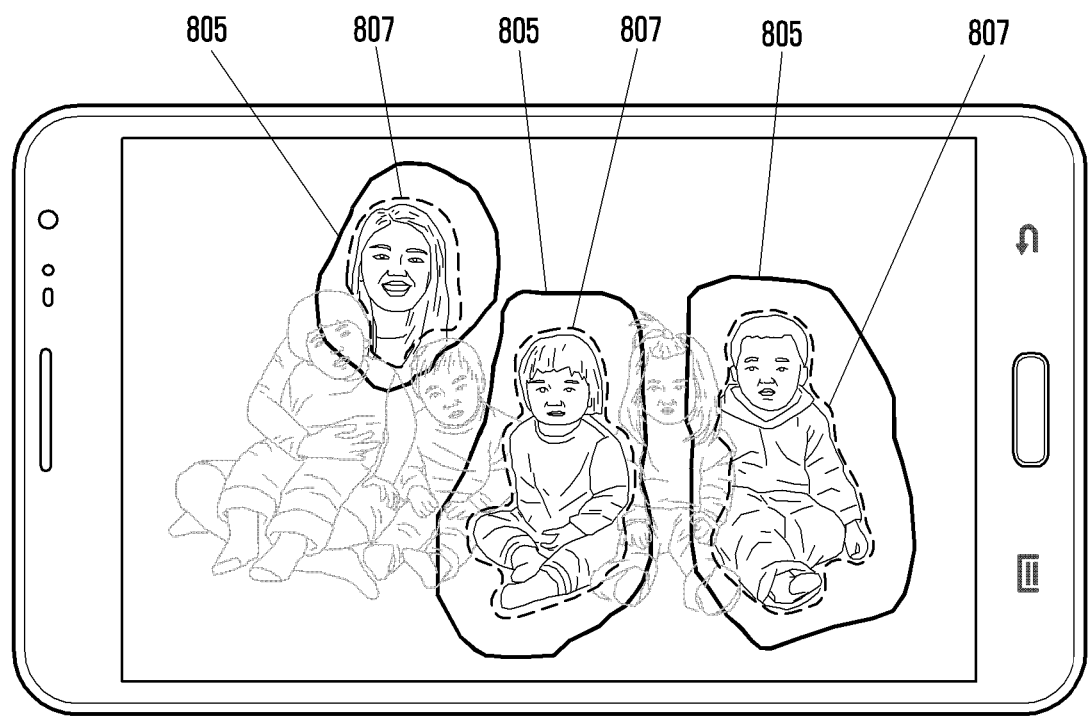

Referring to FIG. 8B, an electronic device according to an embodiment of the present disclosure may detect an object included in an area selected based on a gesture of a user, and may designate the detected object as an area to which sound data is to be linked. For example, as illustrated in FIG. 8B, the electronic device may detect objects 807 inside the closed curves 805 drawn based the gesture of the user, and may designate the detected objects 807 as areas to which sound data is to be linked. Here, the method of detecting an object is a publicly known technology in the image processing field and thus, the descriptions thereof will be omitted.

Figure 8C:
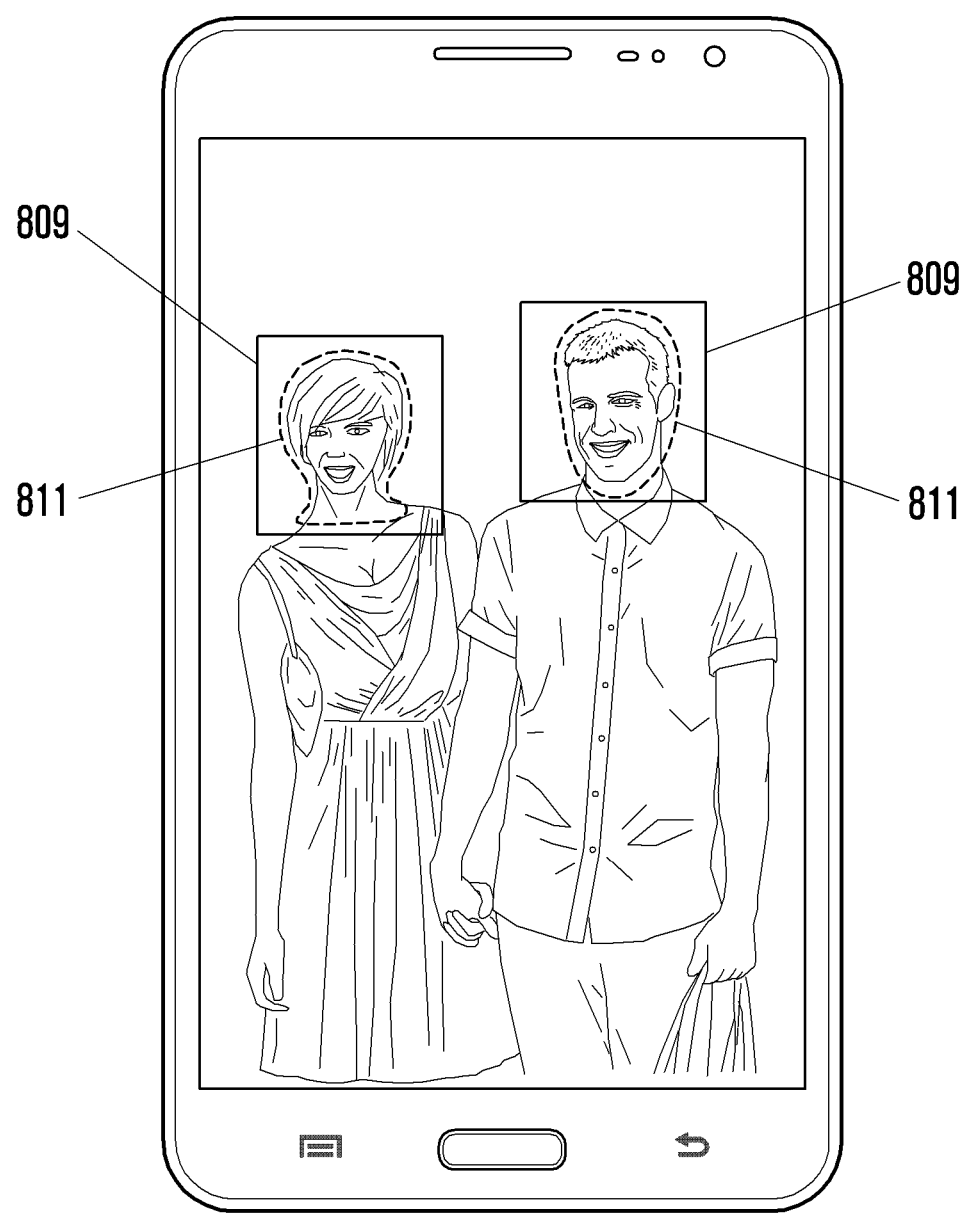

Referring to FIG. 8C, an electronic device according to an embodiment of the present disclosure, may select a certain area of an image using a subject detection technology. For example, the electronic device may detect a face of a subject from the image through a facial detection technology, and may designate an area 809 including the detected face as an image to which sound data is to be linked. Alternatively, the electronic device may designate an area 811 corresponding to the detected face, as an area to which sound data is to be linked.

Figure 8D:
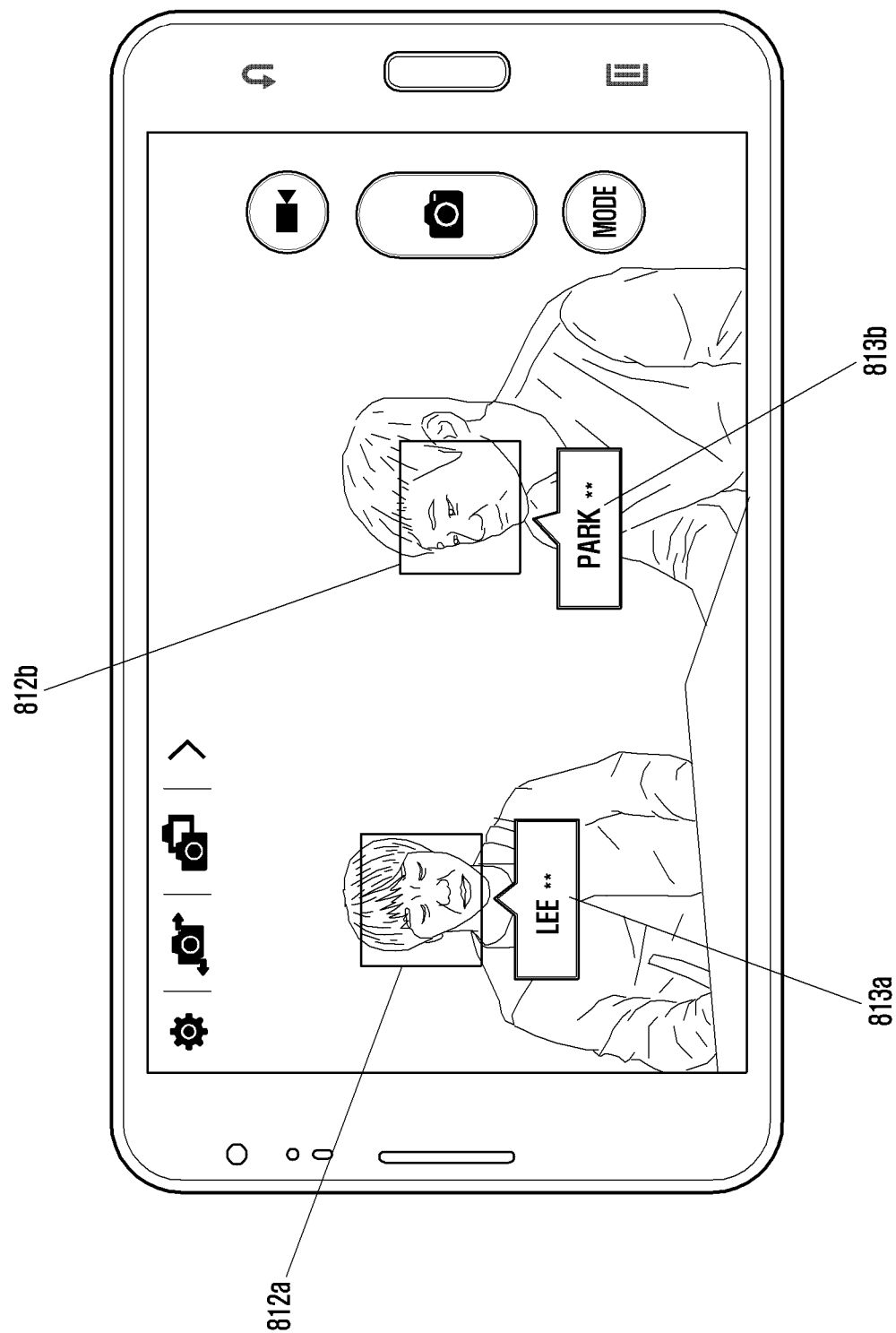

Referring to FIG. 8D, an electronic device according to an embodiment of the present disclosure, may select a certain area in a preview image. For example, the electronic device may select at least one area 812*a* and 812*b* to which sound data is to be linked, through subject detection (for example, facial detection). Alternatively, the electronic device may select a certain area based on a gesture of a user.

As described above, when the certain area to which sound data is to be linked is selected, the electronic device may detect a subject from the selected certain area, and may display information associated with the subject detected through a subject recognition function. For example, as illustrated in FIG. 8D, the electronic device may display information 813*a* and 813*b* associated with a person detected through facial recognition. The information 813*a* and 813*b* associated with the person may be a name or a nickname of a user stored in a phonebook. The information 813*a* and 813*b* associated with the person may be displayed using a word bubble.

Referring to FIG. 8E, an electronic device according to an embodiment of the present disclosure, may select an area to which sound data is to be linked based on a direction where a sound occurs. The direction where a sound occurs may be detected using sound data input through a plurality of microphones. The method of detecting a direction where a sound occurs is a publicly known technology and thus, the descriptions thereof will be omitted.

When occurrence of a sound is detected, the electronic device detects a direction where a sound occurs, and selects a part of an area that includes a subject (for example, a speaker) who is located in the detected direction, as an area to which sound data is to be linked. For example, when a sound occurs in a direction of 90 degrees, the electronic device selects a facial area 814 of speaker 2 as an area to which sound data is to be linked, and when a sound occurs in a direction of 135 degrees, the electronic device selects a facial area 815 of speaker 1 as an area to which sound data is to be linked. In this instance, the electronic device may link the sound occurring in the direction of 90 degrees to the facial area 814 of speaker 2 and may link the sound occurring in the direction of 135 degrees to the facial area 815 of speaker 1. Here, a direction where a sound occurs may be a predetermined range, as opposed to a predetermined angle. The controller 110 may link sound data to the entire area of an image when it is difficult to recognize a direction where a sound occurs.

According to an embodiment of the present disclosure, when a plurality of speakers exists in one direction, the electronic device may group the plurality of speakers into a group, and may link sound data to the group. The controller 110 may recognize faces of the persons included in the group, and when the recognized persons exist in a phonebook, may generate a phonebook group associated with the recognized persons. When a new phonebook group is generated, or when a phonebook group associated with the recognized persons already exists, the controller 110 may transmit a visual sound image to each member.

Although FIG. 8E classifies a direction where a sound occurs into 5 categories (0 degrees, 45 degrees, 90 degrees, 135 degrees, and 180 degrees), embodiments of the present disclosure may not be limited thereto. The direction where a sound occurs may be optimally classified based on a capability of an electronic device. The electronic device may check whether a sound occurs and a direction where a sound occurs, based on a predetermined period. The predetermined period may be optimized based on a capability of the electronic device.

Referring to FIG. 8F, an electronic device according to an embodiment of the present disclosure, may select an area to which sound data is to be linked by tracking a lip. For example, the electronic device detects a lip 817 of at least one subject (for example, at least one person) in a preview screen, and, when a movement of the lip is detected by tracking the detected lip 817, may select a certain area of the corresponding subject (for example, a facial area) as an area to which sound is to be linked. In this instance, the electronic device may link sound data 819 currently input through a microphone to the certain area of the subject of which the movement of the lip is detected.

Figure 8G:
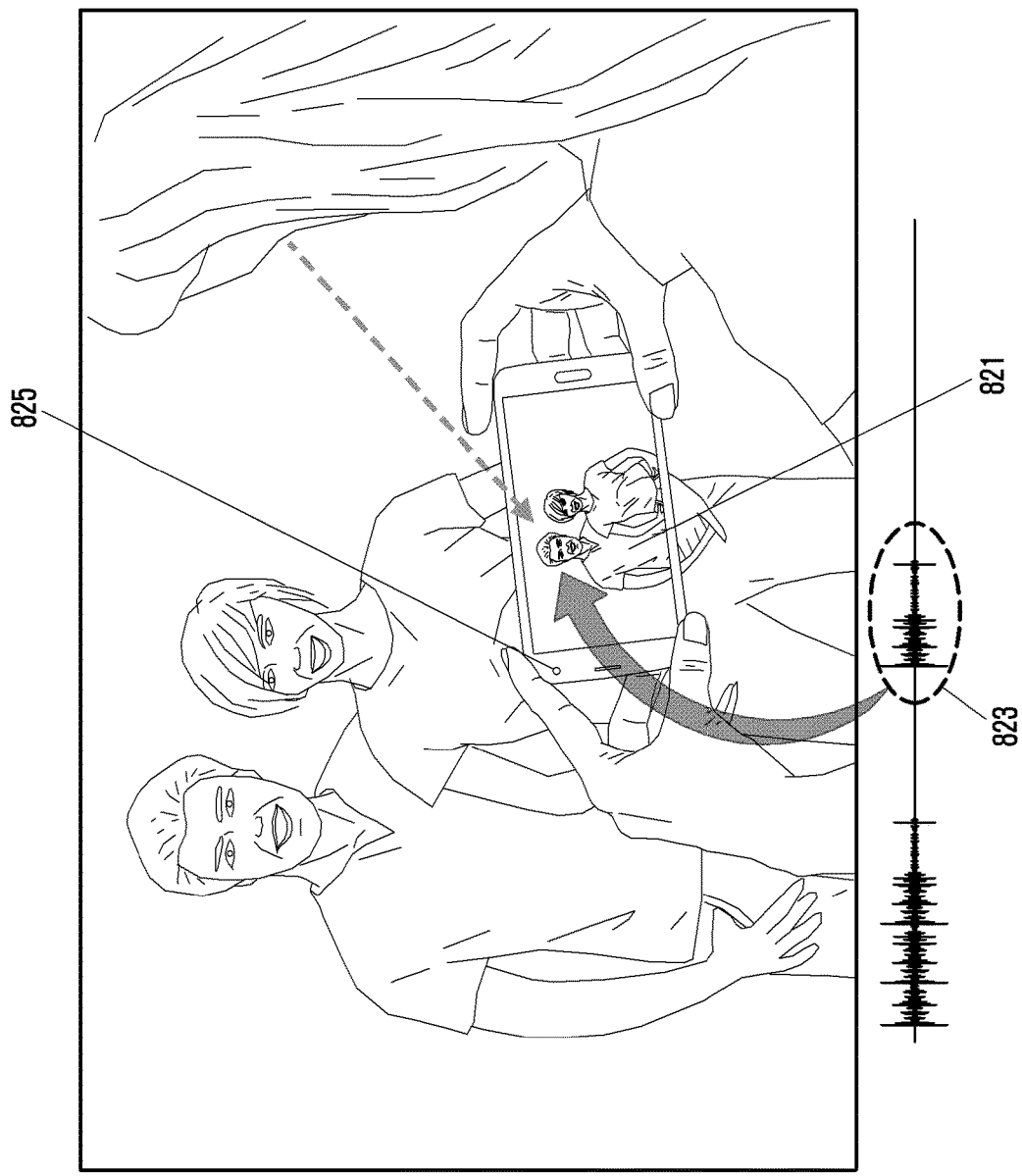

Referring to FIG. 8G, an electronic device according to an embodiment of the present disclosure, may select an area to which sound data is to be linked based on a line of sight of a photographer. For example, the electronic device may track a line of sight of a photographer using a front camera 825 while the photographer previews a subject through a rear camera (not illustrated), so as to recognize the subject that the photographer views. The electronic device may select at least a certain area of a subject 821 that the photographer views, as an area to which sound data is to be linked. The electronic device may link sound data 823 that is input through a microphone to the certain area (for example, a facial area) of the recognized subject 821.

Figure 8H:
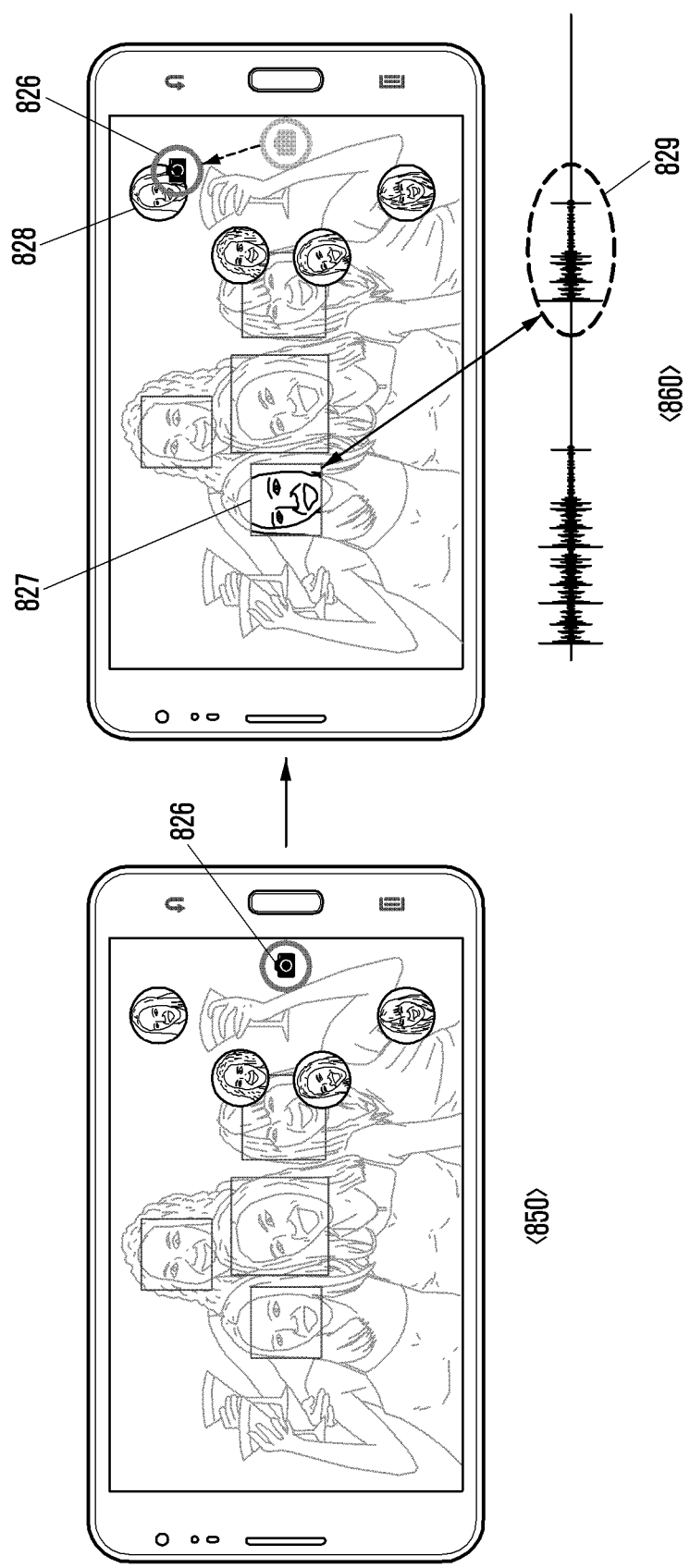

Referring to FIG. 8H, an electronic device according to an embodiment of the present disclosure, may select an area to which sound data is to be linked based on a touch input (for example, a touch and drag) of a user. For example, when a touch on a photographing menu 826 is detected in a preview screen, the electronic device may display information (for example, facial images) associated with subjects included in the preview screen around the photographing menu 826, as shown in the drawing of the reference numeral 850.

When the photographing menu 826 moves above predetermined subject information 828 as shown in the drawing of the reference numeral 860, the electronic device may select a certain area 827 of the subject corresponding to the predetermined subject information 828 as an area to which sound data is to be linked. In this instance, the selected certain area 827 of the subject may be displayed to be visually distinguished from another area. The electronic device may link input sound data 829 to the certain area 827 of the subject. When a release of a touch on the photographing menu 826 is detected, the electronic device may execute photographing.

Figure 8I:
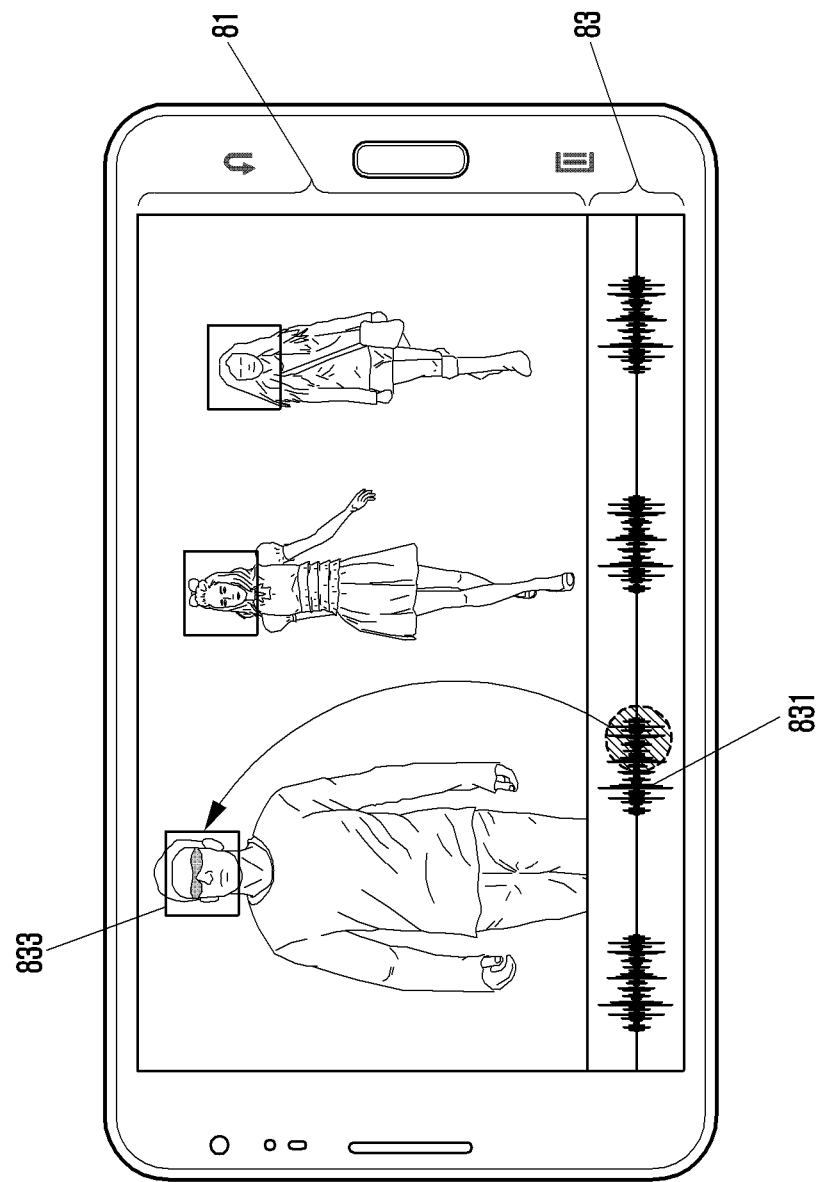
FIG. 8I is a diagram illustrating a screen in association with a method of linking sound data and a certain area of an image according to an embodiment of the present disclosure.

FIG. 8I is a diagram illustrating a screen in association with a method of linking sound data and a certain area of an image according to an embodiment of the present disclosure.

Referring to FIG. 8I, an electronic device according to an embodiment of the present disclosure, divides a screen into two areas, outputs an image in a first area 81, and visualizes and outputs sound data (for example, a graph) in a second area 83. According to an embodiment of the present disclosure, the electronic device may not divide the screen, outputs an image in the entire screen, and displays visualized sound data in one side (for example, the bottom side) of the image by overlapping the image and the visualized sound data. Visualizing of the sound data indicates displaying, in a form of a graph, at least one feature of the sound data, for example, a waveform, a level, an envelope, and the like.

A user may select a certain section 831 of the visualized sound data and link the selected section to a certain area 833 of the image. For example, the user may touch a predetermined location in the visualized sound data, and may drag and drop the same to the certain area 833 of the image to which sound data is to be linked. In this instance, the electronic device extracts the sound data 831 located between a mute section existing before a touched location (a section where only a sound less than or equal to a predetermined size exists) and a mute section existing after the touched location, and links the extracted sound data 831 to the certain area 833 of the image where the touch is released.

According to an embodiment of the present disclosure, the electronic device displays a start mark and an ending mark for selecting a section in a graph of sound data, and enables the user to move the start mark and the ending mart to readily select a certain section of the sound data.

According to an embodiment of the present disclosure, the electronic device recognizes a speaker with respect to each section of the visualized sound data, recognizes a face of a person included in an image, compares a result of the speaker recognition and a result of the facial recognition, and displays a facial image of a matched speaker for each section of the visualized sound data.

According to an embodiment of the present disclosure, when a section is selected, the electronic device may play back sound data of the selected section. To this end, the user may determine, in advance, whether desired sound data is selected well.

According to an embodiment of the present disclosure, the electronic device recognizes a speaker in association with sound data, and classifies sound data for each speaker. Also, the electronic device may execute facial recognition with respect to a person in an image. Based on a result of speaker recognition and a result of facial recognition, the electronic device may automatically link sound data classified for each speaker to a corresponding person. For example, when sound data of person A is included in sound data and a face of person A exists in an image, the electronic device may automatically link the sound data of person A to the face of person A.

Figure 9:
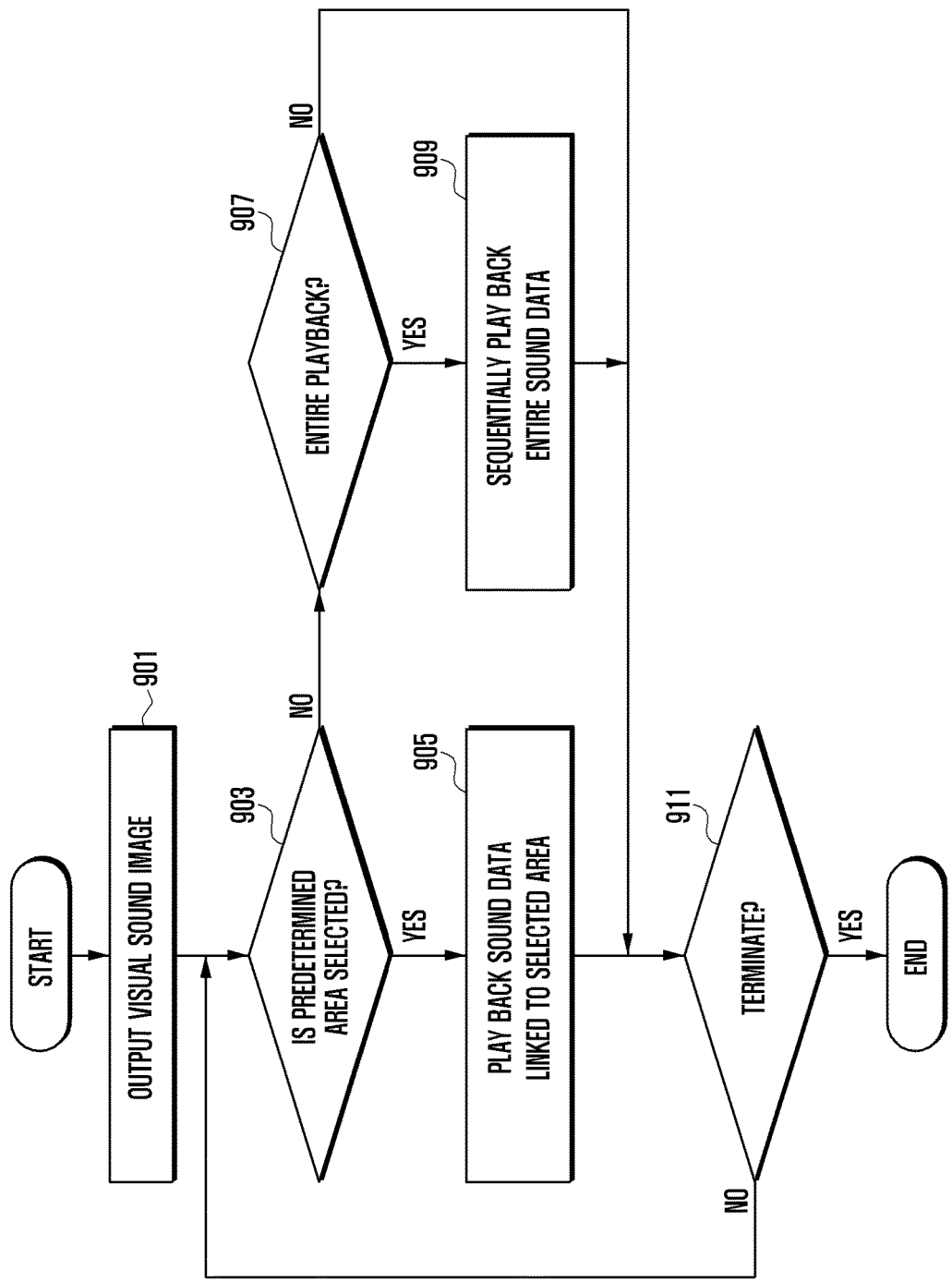
FIG. 9 is a flowchart illustrating a method of playing back sound data included in a visual sound image according to an embodiment of the present disclosure.
Figure 10:
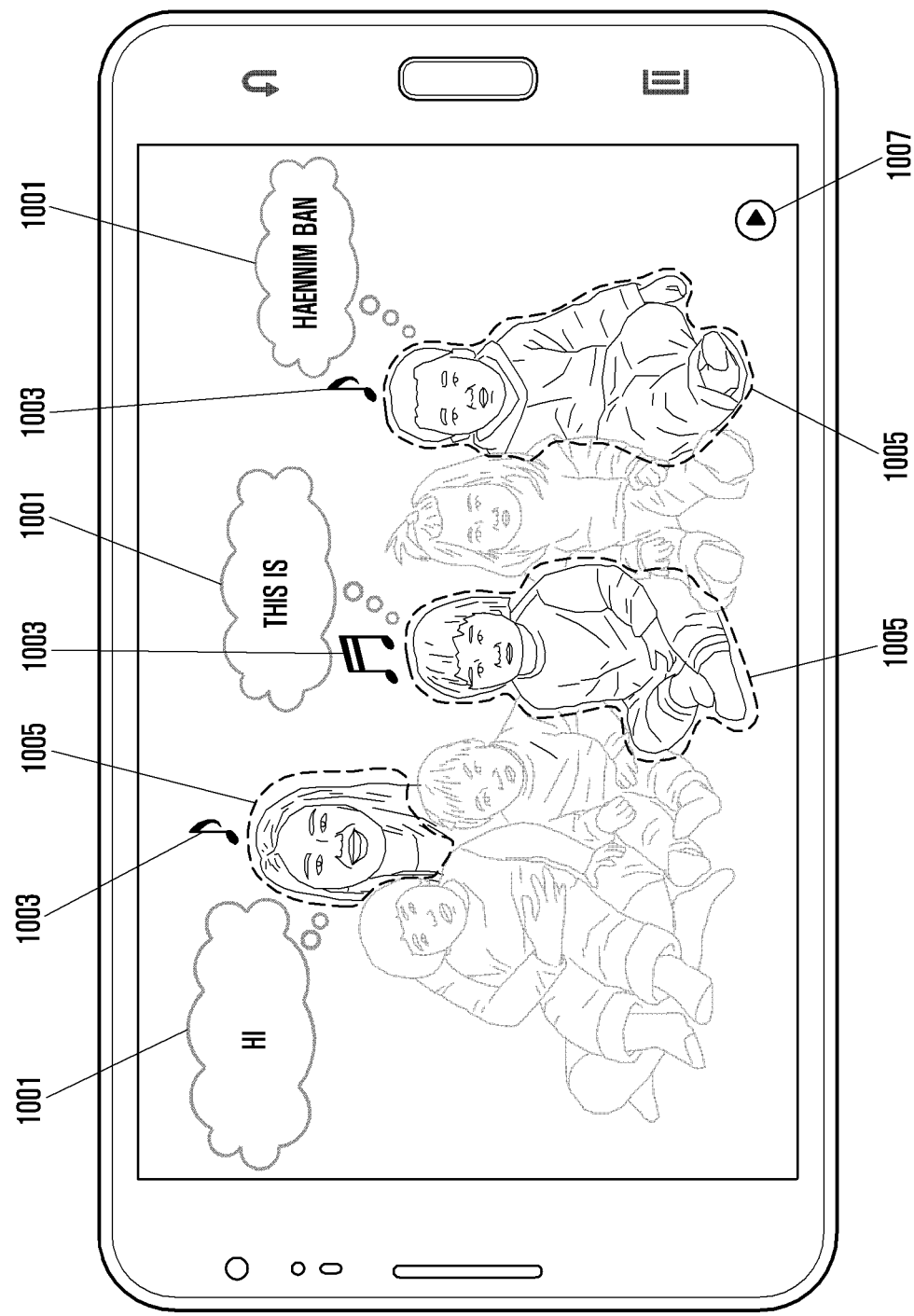
FIG. 10 is a diagram illustrating a screen in association with a method of playing back sound data included in a visual sound image according to an embodiment of the present disclosure.

FIG. 9 is a flowchart illustrating a method of playing back sound data included in a visual sound image according to an embodiment of the present disclosure. FIG. 10 is a diagram illustrating a screen in association with a method of playing back sound data included in a visual sound image, according to an embodiment of the present disclosure.

Referring to FIGS. 9 and 10, a controller 110 of an electronic device according to an embodiment of the present disclosure, may output an image (visual sound image) to which sound data is linked, in operation 901. For example, the controller 110 may output a visual sound image to a display 131, as illustrated in FIG. 10. The controller 110 may control the display unit 131 to display a selected area 1005 of the visual sound image to be visually distinguished from another area (non-selected area). For example, the controller 110 may execute blurring, black and white processing, adjusting a brightness, and the like, so as to enable the selected area 1005 to be visually distinguished from the non-selected area.

The visual sound image may include at least one of a word bubble 1001 indicating at least a part of linked sound data as text, a notification icon 1003 indicating that sound data is linked, and an entire playback icon 1007 requesting sequential playback of linked sound data.

The controller 110 determines whether a predetermined area to which sound data is linked is selected, in operation 903. When the predetermined area is selected, the controller 110 may proceed with operation 905 so as to play back sound data linked to the selected predetermined area. Conversely, when the predetermined area is not selected, the controller 110 may proceed with operation 907 so as to determine whether the entire playback is requested. For example, the controller 110 may determine whether the entire playback icon 1007 is touched.

When the entire playback is requested, the controller 110 may proceed with operation 909 so as to sequentially play back the entire sound data. When the entire playback is not requested, the controller 110 may proceed with operation 911.

The controller 110 may determine whether termination is requested in operation 911. When the termination is not requested, the controller 110 may return to operation 903 so as to execute the above described operations. Conversely, when the termination is requested, the controller 110 may terminate displaying the visual sound image.

Although not illustrated, sound data with various qualities (for example, sound data of a low quality, sound data of a medium quality, and sound data of a high quality) may be linked to a certain area of an image. In this instance, the electronic device may select and play back sound data of an appropriate quality by taking into consideration a capability of an audio processing unit when playing back sound data.

Figure 11:
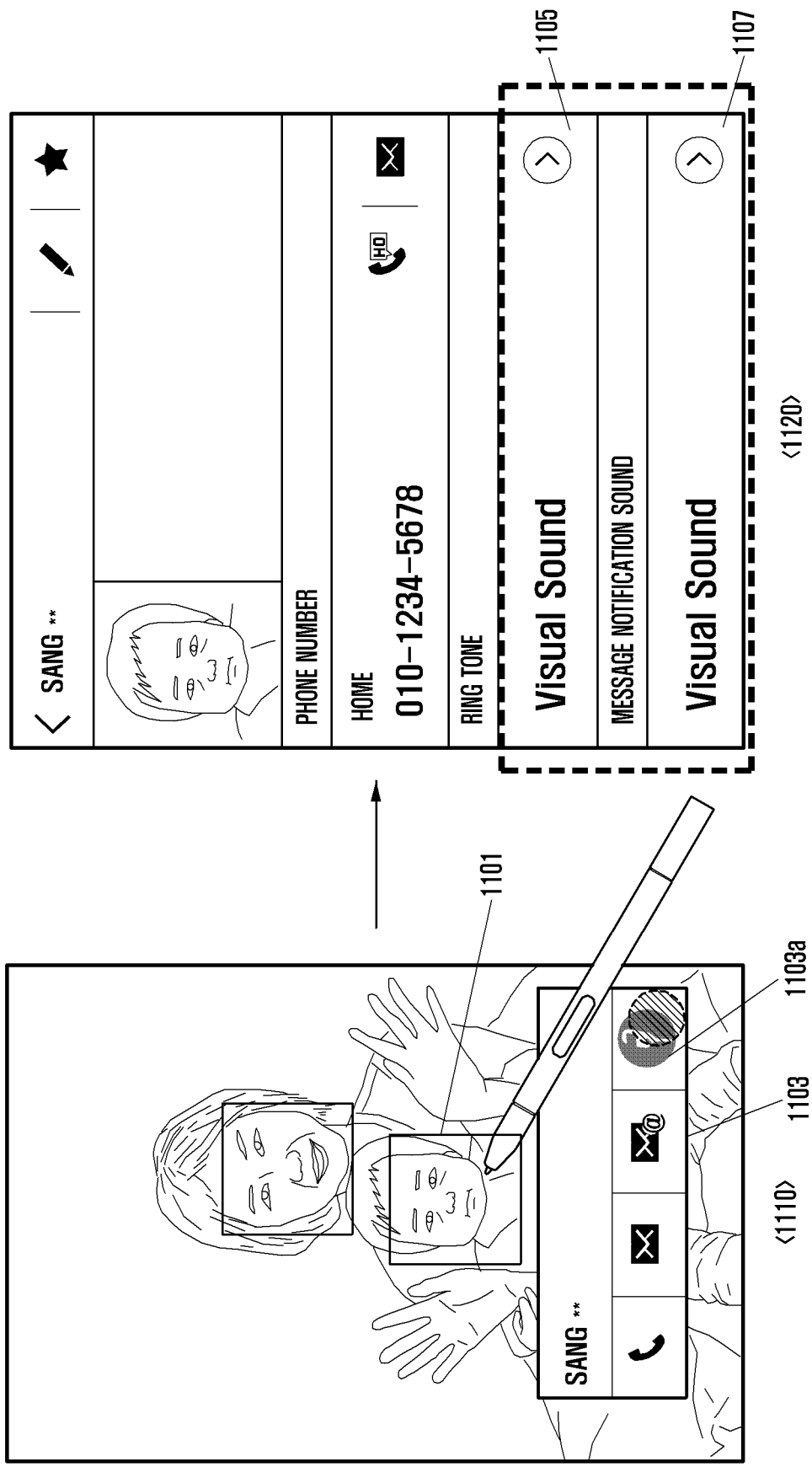
FIG. 11 is a diagram illustrating a screen in association with an example of setting sound data included in a visual sound image as a notification sound according to an embodiment of the present disclosure.

FIG. 11 is a diagram illustrating a screen in association with an example of setting sound data included in a visual sound image as a notification sound according to an embodiment of the present disclosure.

Hereinafter, it is assumed that the electronic device distinguishes a touch input of a stylus and a touch input of a finger. For example, the touch input of the stylus may be detected through a touch panel of an electromagnetic inductive type, and the touch of a finger may be detected through a touch panel of a capacitive type.

Referring to FIG. 11, an electronic device according to an embodiment of the present disclosure may output an image to which sound data is linked. When the touch input of the stylus is detected in an area 1101 where the sound data is linked, the electronic device may output a popup menu window 1103 including a plurality of menus as shown in the drawing of the reference numeral 1110.

When a sound effect designating menu 1103a is selected in the popup menu window 1103, the electronic device may designate sound data linked to the area 1101 as a notification sound indicating reception of information (for example, an SMS, MMS, IM, e-mail, or the like) associated with a corresponding person. For example, the electronic device may change, into the linked sound data, a ring tone 1105 and a message notification sound 1107 stored in phonebook information of a person included in the area 1101, as shown in the drawing of the reference numeral 1120.

Figure 12:
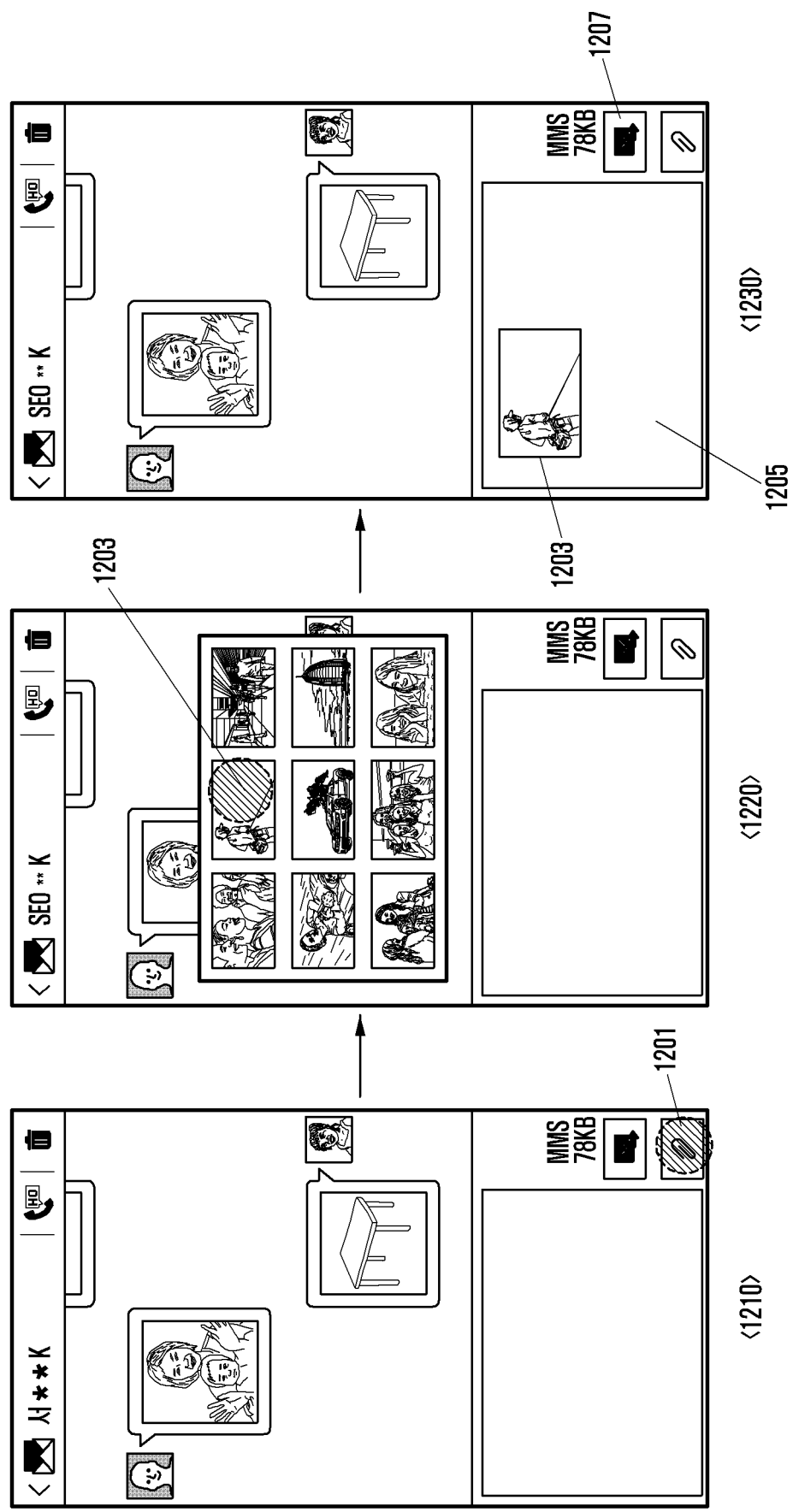
FIG. 12 is a diagram illustrating a screen in association with an example of sharing a visual sound image according to an embodiment of the present disclosure.

FIG. 12 is a diagram illustrating a screen in association with an example of sharing a visual sound image, according to an embodiment of the present disclosure.

Referring to FIG. 12, an electronic device according to an embodiment of the present disclosure may transmit an image to which sound data is linked to another electronic device, through a multimedia messaging service (MMS) or an instant message (IM). For example, a file attachment icon 1201 is selected in a chat screen as shown in the drawing of the reference numeral 1210, the electronic device may display a thumbnail list of stored files as shown in the drawing of the reference numeral 1220. When a thumbnail 1203 of an image to which sound data is linked is selected from the thumbnail list, the electronic device may display the selected thumbnail 1203 in a message input area 1205 as shown in the drawing of the reference numeral 1230. Subsequently, when a transmission menu 1207 is input, the electronic device may transmit a file corresponding to the selected thumbnail to a terminal of a partner whom the user has conversation with. In this instance, the electronic device may configure image data and sound data in a form of a package and transmit the same to the terminal of the partner. For example, the data transmitted to the terminal of the partner may have a structure as shown in FIG. 3.

When sound data with various qualities (for example, sound data of a low quality, sound data of a medium quality, and sound data of a high quality) are linked to a certain area of an image, the electronic device may link sound data of an appropriate quality to image data by taking into consideration network traffic (for example, uploading rate) and may transmit the same to another electronic device. For example, the electronic device links sound data of a low quality and executes transmission when the uploading rate is less than a first reference value, links sound data of a medium quality and executes transmission when the uploading rate is greater than or equal to the first reference value and less than a second reference value, and links sound data of a high quality and executes transmission when the uploading rate is greater than or equal to the second reference value.

According to an embodiment of the present disclosure, the electronic device may transmit a visual sound image to a terminal of a partner by taking into consideration a type of the partner's terminal, a sound data playback capability, or the like. For example, when transmission of a visual sound image is requested, the electronic device requests and receives information associated with the type of terminal, the sound data playback capability, or the like, generates a visual sound image by linking sound data of an appropriate quality to an image based on the received information, and transmits the generated visual sound image to the terminal of the partner. Alternatively, the electronic device may remove the remaining sound data after excluding sound data of a quality appropriate to the partner's terminal from the sound data with various qualities that is linked to the visual sound image, and transmit the visual sound image to the partner's terminal.

Figure 13:
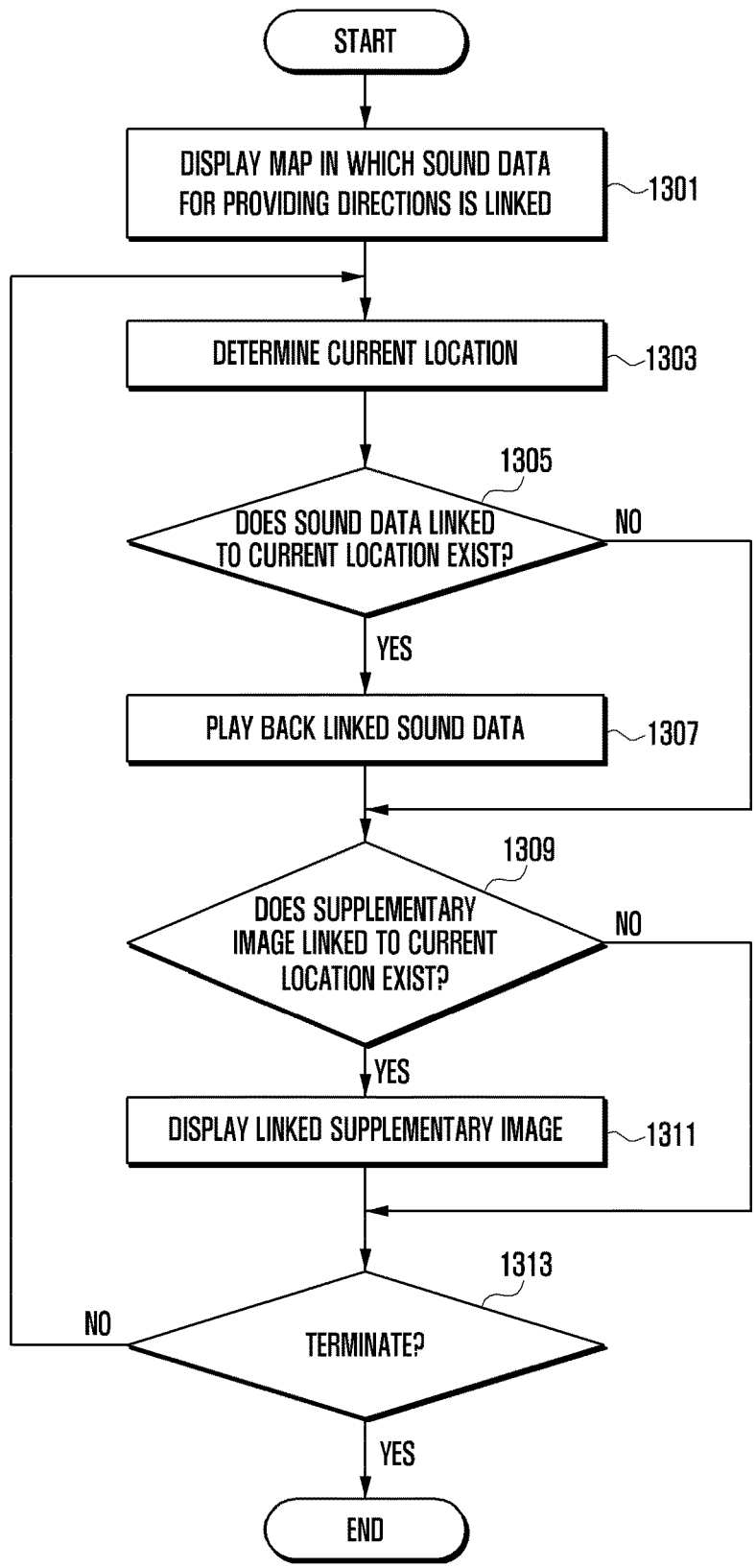
FIG. 13 is a flowchart illustrating a method of providing directions using a visual sound image, according to an embodiment of the present disclosure.

FIG. 13 is a flowchart illustrating a method of providing directions using a visual sound image, according to an embodiment of the present disclosure.

Referring to FIG. 13, the controller 110 of the electronic device 100 according to an embodiment of the present disclosure may display a map in which sound data is linked to provide directions, in operation 1301. The map may not be a general map for providing directions, but may be a map in which a user links sound data for providing directions to a predetermined location.

The controller 110 may determine a current location in operation 1303. For example, the controller 110 may determine the current location through the location information receiving unit 170.

When the determination of the current location is completed, the controller 110 may determine whether sound data linked to the current location exists, in operation 1305. When the sound data does not exist, the controller 110 may proceed with operation 1309. Conversely, when the sound data exists, the controller 110 may proceed with operation 1307 to play back the linked sound data.

The controller 110 may determine whether a supplementary image linked to the current location exists in operation 1309. The supplementary image may be an actual image of the current location, an enlarged image, or the like.

When the supplementary image data does not exist, the controller 110 may proceed with following described operation 1313. Conversely, when the supplementary image exists, the controller 110 may proceed with operation 1311 to output the linked supplementary image.

The controller 110 may determine whether termination of providing directions is requested in operation 1313. When the termination is not requested, the controller 110 may return to operation 1303, to repeat the aforementioned operations. Conversely, when the termination is requested, the controller 110 may terminate providing directions.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 110), the one or more processors may execute a function corresponding to the command. The computer-readable storage medium may be, for example, the memory 120. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   operating a camera of the electronic device in response to a user request;
   displaying a preview image including at least one object obtained from the camera on a display;
   collecting, in response to a selection for a recording menu, sound data using a recording function in a state in which the preview image is displayed;
   displaying a visual representation corresponding to the collected sound data in the preview image;
   selecting a certain section of the visual representation;
   selecting a certain area including a speaker related to the selected certain section in the preview image displayed on the display;
   linking the sound data corresponding to the selected certain section to the certain area;
   storing a sound image in which the sound data is linked to the certain area; and
   when a slideshow associated with a plurality of images to which sound data is linked is requested, changing a slide interval based on a playback time of the sound data linked to each image in the plurality of images.

2. The method of claim 1, further comprising displaying, by the electronic device, at least one of a symbol, an icon, text, a photo, or a picture, which indicates the linkage of the sound data to the certain area, in the sound image on the display.

3. The method of claim 1, wherein the selecting of the certain area comprises at least one of:
   tracking a line of sight of a photographer, and selecting the certain area to include a subject located in the line of sight of the photographer;
   tracking a lip movement of a subject while collecting the sound data, and selecting the certain area to include the subject of which a lip moves based on a result of the tracking;
   recognizing a direction where a sound occurs when occurrence of the sound is detected while collecting the sound data, and selecting the certain area to include a subject located in the recognized direction; or
   when a touch on a photographing menu is detected in the preview image, displaying at least one icon corresponding to at least one subject included in the preview image, around the photographing menu, and when the photographing menu is dragged to a location where a predetermined icon is displayed, selecting the certain area corresponding to the predetermined icon.

4. The method of claim 3, further comprising:
   when the subject located in the recognized direction includes a plurality of people while the sound data is being collected, grouping the plurality of people into a group and linking the sound data to the group.

5. The method of claim 1, further comprising:
   when the certain area includes a person, determining information associated with the person through facial recognition and displaying the information.

6. The method of claim 1, further comprising:
   when the sound data is linked to a person, designating the sound data linked to the person as a notification sound that indicates reception of information associated with the person.

7. The method of claim 1, wherein the linking of the sound data comprises at least one of:
   selecting one of sound data stored in advance, and linking the selected sound data to the certain area in the state in which the preview image is displayed;
   generating new sound data using the recording function, and linking the generated sound data to a corresponding area of the preview image; or
   linking address information of a webpage where sound data exists, in the state in which the preview image is displayed.

8. The method of claim 3, further comprising:
   displaying the certain area to be visually distinguished from a remaining area of the preview image.

9. The method of claim 1, further comprising:
   recognizing each section of the visual representation;
   recognizing a face of a person included in the preview image; and
   comparing the speaker corresponding to each section of the visual representation and a result of the facial recognition, and displaying a facial image of a matched speaker for each corresponding section of the visual representation.

10. The method of claim 2, further comprising at least one of:
    playing back, when an area of the sound image to which sound data is linked, or the symbol, the icon, the text, the photo, or the picture is selected, the sound data linked to the selected area; or
    when playback of the entire sound data linked to the sound image is requested, sequentially playing back at least one piece of sound data that is linked to the sound image, in a sequence designated by a user, in a sequence of linkage of sound data, or in a random sequence.

11. The method of claim 10, wherein the sequentially playing back comprises:
    changing a playback sequence of the sound data based on information associated with a receiver that receives an image to which the sound data is linked, and executing playback based on the changed playback sequence.

12. The method of claim 10, wherein the sequentially playing back comprises:
    highlighting and displaying an area to which currently played back sound data is linked in the sound image.

13. The method of claim 1, further comprising at least one of:
    when a plurality of pieces of sound data having different qualities are linked to a single area of an image, selecting and playing back one of the plurality of pieces of sound data based on a capability of an audio processing unit; or
    checking a communication speed when image data to which sound data is linked is requested to be transmitted to another electronic device, and selecting and transmitting one of the plurality of pieces of sound data based on the communication speed.

14. The method of claim 2, further comprising at least one of:
    editing linked sound data in response to editing of the sound image to which the sound data is linked; or
    when a plurality of sound images to which sound data is linked are composed, composing the sound data that is linked to the plurality of sound images.

15. An electronic device comprising:
    a camera;
    a touchscreen;
    at least one processor configured to:
      operate the camera in response to a user request,
      control a display of the touchscreen to display a preview image including at least one object,
      collect, in response to a selection for a recording menu, sound data using a recording function in a state in which the preview image is displayed,
      control the display to display a visual representation corresponding to the collected sound data in the preview image,
      select a certain section of the visual representation,
      select a certain area including a speaker related to the selected certain section in the displayed preview image,
      generate, if the recording menu is reselected, a sound image linking the certain area to the sound data corresponding to the selected certain section, and
      when a slideshow associated with a plurality of images to which sound data is linked is requested, change a slide interval based on a playback time of the sound data linked to each image in the plurality of images; and
    a memory configured to store the sound image in which the sound data is linked to the certain area.

16. The electronic device of claim 15, wherein the at least one processor is further configured to display, on the preview image, at least one of a symbol, an icon, text, a photo, or a picture indicating linkage of the sound data to the certain area after storing the sound image.

17. The electronic device of claim 15, wherein the at least one processor is further configured to at least one of:
    track a line of sight of a photographer, and select the certain area to include a subject located in the line of sight of the photographer;
    track a lip movement of the subject, and select the certain area to include the subject of which a lip moves;
    recognize a direction where a sound occurs when occurrence of the sound is detected while collecting the sound data, and select the certain area to include the subject located in the recognized direction; or
    when a touch on a photographing menu is detected in the preview image, display, around the photographing menu, at least one icon corresponding to the subject included in the preview image, and when the photographing menu is dragged to a predetermined icon, select the certain area corresponding to the predetermined icon.

18. The electronic device of claim 17, wherein, when the subject located in the recognized direction includes a plurality of people while the sound data is being collected, the at least one processor is further configured to group the plurality of people into a group and link the sound data to the group.

19. The electronic device of claim 15, wherein the at least one processor is further configured to execute a control to recognize information associated with a subject included in the certain area, and to display the recognized information with the subject included in the certain area.

20. The electronic device of claim 15, wherein the at least one processor is further configured to designate sound data linked to a person included in the sound image, as a notification sound indicating reception of information associated with the person.

21. The electronic device of claim 15, wherein the at least one processor further comprises a linker configured to link one of sound data stored in advance, sound data newly generated using the recording function, or address information of a webpage where sound data exists, to the certain area or to the preview image.

22. The electronic device of claim 15, wherein the at least one processor is further configured to control the display to display the certain area to be visually distinguished from a remaining area of the preview image.

23. The electronic device of claim 15, wherein the at least one processor is further configured to:
    recognize each section of the visual representation,
    recognize a face with respect to a person included in the preview image, and
    compare the speaker corresponding to each section of the visual representation and a result of the facial recognition, and display a facial image of a matched speaker for each section of the visual representation.

24. The electronic device of claim 16, wherein the at least one processor is further configured to:
    play back, when an area of the sound image to which sound data is linked, or the symbol, the icon, the text, the photo, or the picture is selected, the sound data linked to the selected area, and sequentially play back at least one piece of sound data linked to the sound image in a sequence designated by a user request, in a sequence of linkage of the sound data, or in a random sequence, when playback of the entire sound data linked to the sound image is requested.

25. The electronic device of claim 24, wherein the at least one processor is further configured to:

determine information associated with a receiver that receives an image to which the sound data is linked when the playback of the entire sound data is requested, change a sequence of playback of the entire sound data based on the determined receiver information, and play back the entire sound data based on the changed playback sequence.

26. The electronic device of claim 24, wherein the at least one processor is further configured to highlight and display an area to which currently played back sound data is linked when the entire sound data is sequentially played back in the sound image.

27. The electronic device of claim 15, wherein, when a plurality of pieces of sound data having different qualities are linked to a single area, the at least one processor is further configured to:

select and play back one of the plurality of pieces of sound data, based on a capability of an audio processing unit, and check a communication speed when image data to which sound data is linked is requested to be transmitted to another electronic device, and select and transmit one of the plurality of pieces of sound data based on the communication speed.

28. The electronic device of claim 15, wherein the at least one processor is further configured to:

edit sound data linked to the sound image in response to editing an image to which the sound data is linked, or compose, when a plurality of sound images to which the sound data is linked are composed, sound data linked to the plurality of sound images.

* * * * *